United States Patent [19]
Saito

[11] Patent Number: 5,339,298
[45] Date of Patent: Aug. 16, 1994

[54] OVER-WRITE CAPABLE MAGNETOOPTICAL RECORDING METHOD WITH WIDENED POWER MARGIN, AND MAGNETOOPTICAL RECORDING APPARATUS USED IN THIS METHOD

[75] Inventor: Jun Saito, Tokyo, Japan

[73] Assignee: Nikon Corporation, Tokyo, Japan

[21] Appl. No.: 941,934

[22] Filed: Sep. 8, 1992

[30] Foreign Application Priority Data

Sep. 13, 1991 [JP] Japan .................. 3-234674

[51] Int. Cl.$^5$ .................................... G11B 13/04
[52] U.S. Cl. .......................... 369/13; 360/59
[58] Field of Search ............... 369/13, 116, 124, 14; 360/59, 114; 365/122

[56] References Cited

U.S. PATENT DOCUMENTS

| | | | |
|---|---|---|---|
| 4,894,816 | 1/1990 | Sukeda et al. | 369/116 |
| 4,939,717 | 7/1990 | Ohno et al. | 369/116 |
| 5,084,857 | 1/1992 | Miyauchi et al. | 369/116 |
| 5,216,660 | 6/1993 | Iimura | 369/116 |

FOREIGN PATENT DOCUMENTS

| | | |
|---|---|---|
| 3619618 | of 1986 | Fed. Rep. of Germany . |
| 64-50257 | 2/1989 | Japan . |
| 1-273248 | 11/1989 | Japan . |
| WO90/02400 | 8/1989 | PCT Int'l Appl. . |

OTHER PUBLICATIONS

The Bell System Technical Journal, vol. 62, (Sep. 1983), pp. 1923–1936.
Japanese Journal "Optronics", 1990, No. 4, pp. 227–231.

*Primary Examiner*—Robert J. Pascal
*Assistant Examiner*—Tan Dinh
*Attorney, Agent, or Firm*—Shapiro and Shapiro

[57] ABSTRACT

An over-write capable magnetooptical recording method of this invention includes the steps of: preparing an "over-write capable multi-layered magnetooptical recording medium, which consists of at least two layers including a memory layer and a writing layer, and in which the memory layer and the writing layers are exchange-coupled to each other, the direction of magnetization of the writing layer can be aligned in a predetermined direction at room temperature without changing the direction of magnetization of the memory layer, and the direction of the magnetization of the writing layer is already aligned in the predetermined direction"; rotating the medium; irradiating a laser beam onto the medium; pulse-modulating the intensity of the laser beam between a high level $P_H$ and a low level $P_L$ according to binary coded information to be recorded; and applying a bias field to the irradiation position of the laser beam. After mark formation based on the beam at the high level $P_H$ is started, the level is slightly decreased to continue the mark formation. An apparatus for embodying this method is also disclosed.

6 Claims, 31 Drawing Sheets

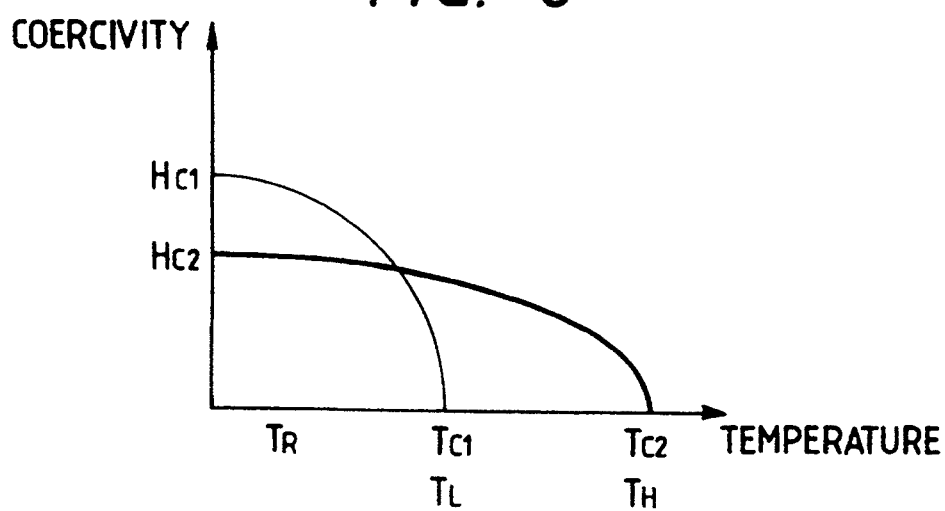

FIG. 8

Hini. ↑    M LAYER  | X  |
           W LAYER  | ⇑  |   CONDITION 1

Hb ↓   |    |
       | ⇓  |   CONDITION 2

Hb ↓   | ⇓ |              Hb ↓   | ⇑ |
       | ⇓ |  CONDITION 3         | ⇓ |  CONDITION 4
       P TYPE                      A TYPE

Hb ↓   |    |
       | ⇑  |   CONDITION 5

Hb ↓   | ⇑ |              Hb ↓   | ⇓ |
       | ⇑ |  CONDITION 6         | ⇑ |  CONDITION 7
       P TYPE                      A TYPE

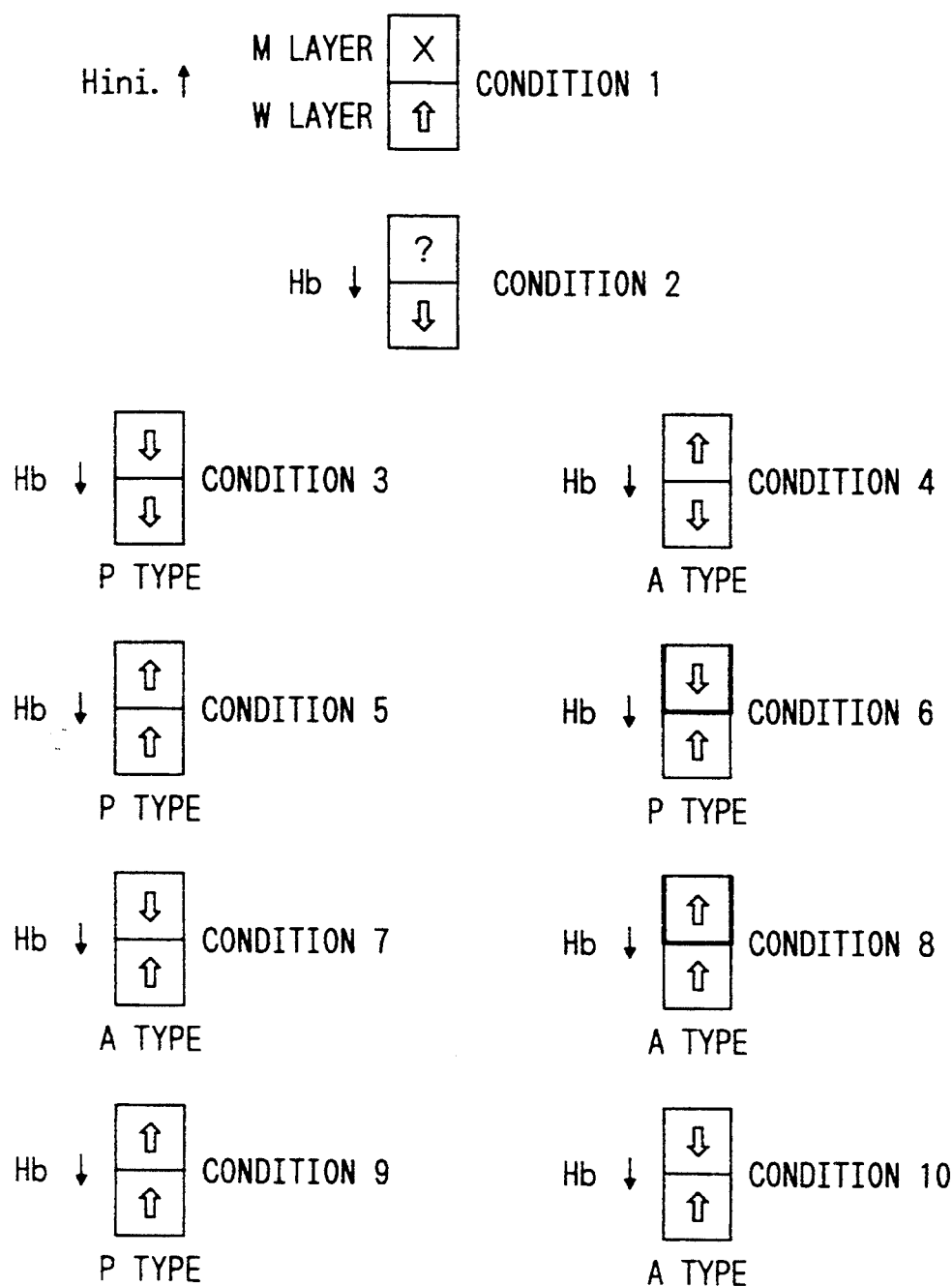

$P_H = 7.8 \quad P_L = 4.2 \quad P_{LB} = 0$ $P_H = 7.8$   $P_L = 4.2$   $P_{LB} = 0$ $P_H = 7.8 \quad P_L = 4.2 \quad P_{LB} = 3.0$

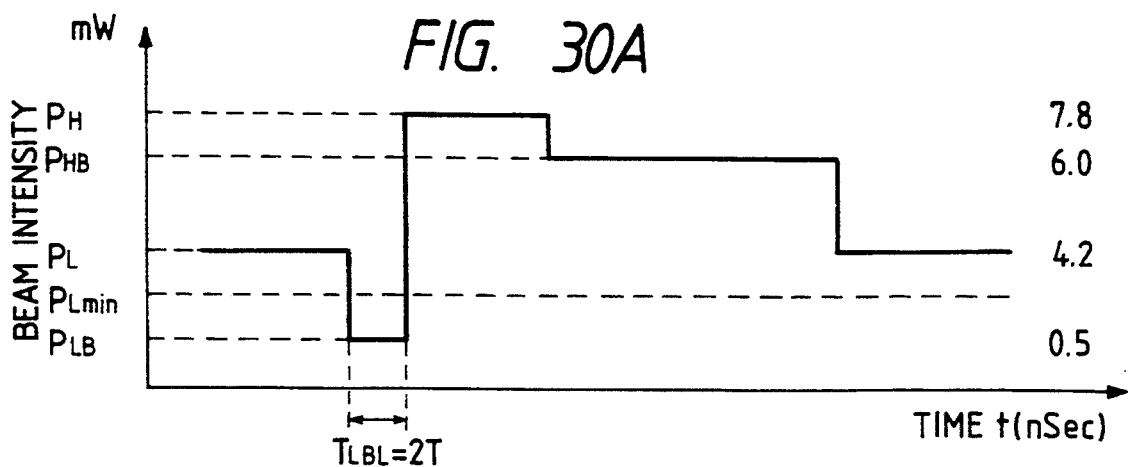
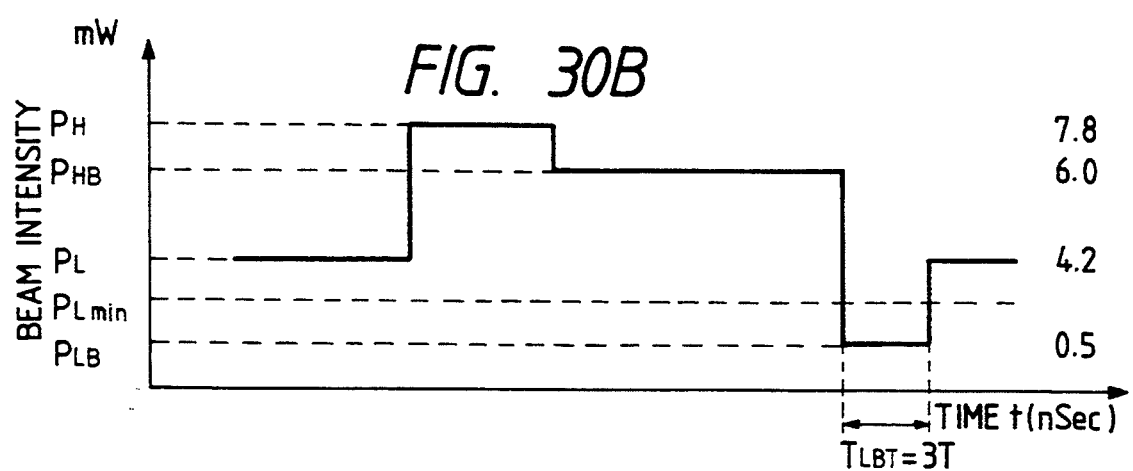
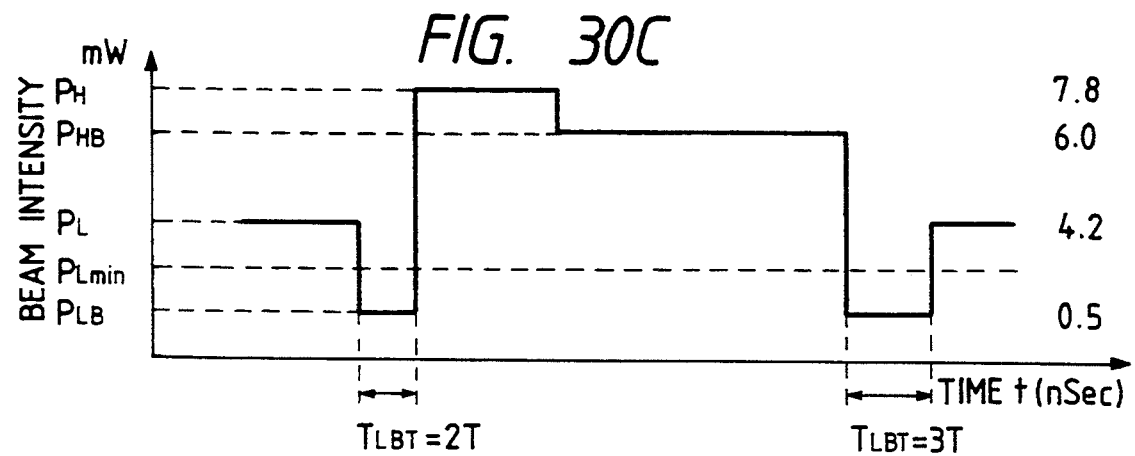

OVER-WRITE CAPABLE MAGNETOOPTICAL RECORDING METHOD WITH WIDENED POWER MARGIN, AND MAGNETOOPTICAL RECORDING APPARATUS USED IN THIS METHOD

BACKGROUND OF THE INVENTION

1. Field of the Invention

The present invention relates to (i) a magnetooptical recording method which can perform an over-write operation upon a medium being irradiated with a laser beam, which is pulse-modulated according to binary information to be recorded, without modulating the direction and intensity of a bias field Hb, and (ii) a magneto-optical recording apparatus used therefor.

An over-write operation means an operation for recording new information without prior erasing of previous information. In this case, when recorded information is reproduced, the previous information must not be reproduced.

2. Related Background Art

In recent years, many efforts have been made to develop an optical recording/reproduction method Which can satisfy various requirements including high density, large capacity, high access speed, and high recording/reproduction speed, and a recording apparatus, a reproduction apparatus, and a recording medium used therefor.

Of various optical recording/reproduction methods, the magnetooptical recording/reproduction method is most attractive due to its unique advantages in that information can be erased after it is recorded, and new information can be repetitively recorded.

A recording medium used in the magnetooptical recording/reproduction method has a perpendicular magnetic layer or layers as a recording layer. The magnetic layer comprises, for example, amorphous GdFe or GdCo, GdFeCo, TbFe, TbCo, TbFeCo, and the like, Concentrical or spiral tracks are normally formed on the recording layer, and information is recorded on the tracks.

There are two types of tracks, i.e., explicit tracks and implicit tracks.

Explicit Track

A magnetooptical recording medium has a disk shape. When a disk having explicit tracks is viewed from a direction perpendicular to the disk plane, spiral or concentric tracks for recording information are formed. A groove for tracking and separation is present between two adjacent tracks. Contrary to this, a portion between adjacent grooves is called a land. In practice, the lands and grooves are reversed on the upper and lower surfaces of the disk. Thus, when the disk is viewed from the same direction as the beam incidence direction, a near portion is called a groove, and a far portion is called a land. A perpendicular magnetic film is formed on both the grooves and lands. For this reason, a groove portion may be used as a track, and a land portion may be used as a track. The widths of the groove and land have no special relationship therebetween.

In order to form such lands and grooves, lands formed on a surface in a spiral or concentrical pattern, and grooves each sandwiched between two adjacent grooves are present on a substrate. A perpendicular magnetic film is formed on such a substrate.

Mark

In this specification, one of "upward" and "downward" directions of magnetization with respect to a film surface is defined as an "A direction", and the other one is defined as a "non-A direction". Information to be recorded is binary-coded in advance, and is recorded by two signals, i.e., a bit ($B_1$) having an "A-directed" magnetization, and a bit ($B_0$) having a "non-A-directed" magnetization. These bits $B_1$ and $B_0$ correspond to "1" and "0" levels of a digital signal. However, in general, the direction of magnetization of the recording tracks can be aligned in the "non-A direction" by applying a strong external field before recording. This "aligning process" is called "initialize*" in a conventional sense. Thereafter, a bit ($B_1$) having an "A-directed" magnetization is formed on the tracks. Information is expressed in accordance with the presence/absence and/or a bit length of the bit ($B_1$). Note that a bit is often called a pit previously but called a mark recently.

Principle of Mark Formation

In the bit formation, a characteristic feature of laser, i.e., excellent coherence in space and time, is effectively used to focus a beam into a spot as small as the diffraction limit determined by the wavelength of the laser light. The focused light is radiated onto the track surface to record information by producing bits less than 1 μm in diameter on the recording layer. In the optical recording, a recording density up to $10^8$ bits/cm² can be theoretically attained, since a laser beam can be concentrated into a spot with a size as small as its wavelength.

As shown in FIG. 2, in the magnetooptical recording, a laser beam (L) is focused onto a recording layer (1) to heat it, while a bias field (Hb) is externally applied to the heated portion in the direction opposite to the initialized* direction. A coercivity $H_C$ of the locally heated portion is decreased below the bias field (Hb). As a result, the direction of magnetization of that portion is aligned in the direction of the bias field (Hb). In this way, reversely magnetized marks are formed.

Ferromagnetic and ferrimagnetic materials differ in the temperature dependencies of the magnetization and $H_C$. Ferromagnetic materials have $H_C$ which decreases around the Curie temperature and allow information recording based on this phenomenon. Thus, information recording in ferromagnetic materials is referred to as $T_C$ recording (Curie temperature recording).

On the other hand, ferrimagnetic materials have a compensation temperature $T_{comp.}$, below the Curie temperature, at which magnetization (M) becomes zero. The $H_C$ abruptly increases around this temperature and hence abruptly decreases outside this temperature. The decreased $H_C$ is canceled by a relatively weak bias field (Hb). Namely, recording is enabled. This process is called $T_{comp.}$ recording (compensation point recording).

In this case, however, there is no need to adhere to the Curie point or temperatures therearound, and the compensation temperature. In other words, if a bias field (Hb) capable of canceling a decreased $H_C$ is applied to a magnetic material having the decreased $H_C$ at a predetermined temperature higher than a room temperature, recording is enabled.

Principle of Reproduction

FIG. 3 shows the principle of information reproduction based on the magnetooptical effect. Light is an electromagnetic wave with an electromagnetic-field vector normally emanating in all directions in a plane perpendicular to the light path. When light is converted to linearly polarized beams ($L_P$) and irradiated onto a recording layer (1), it is reflected by its surface or passes through the recording layer (1). At this time, the plane of polarization rotates according to the direction of magnetization (M). This phenomenon is called the magnetic Kerr effect or magnetic Faraday effect.

For example, if the plane of polarization of the reflected light rotates through $\theta_k$ degrees for the "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by a "non-A-direction" magnetized mark ($B_0$) cannot pass through the analyzer. On the contrary, a component corresponding to a product of $(\sin 2\theta_k)^2$ and the light reflected by a mark ($B_1$) magnetized along the "A direction" passes through the analyzer and becomes incident on a detector (photoelectric conversion means). As a result, the mark ($B_1$) magnetized along the "A direction" looks brighter than the mark ($B_0$) magnetized along the "non-A direction", and causes the detector to produce a stronger electrical signal. The electrical signal from the detector is modulated in accordance with the recorded information, thus reproducing the information.

In order to re-use a recorded medium, (i) the medium must be re-initialized* by an initialize* device, or (ii) an erase head having the same arrangement as a recording head must be added to a recording apparatus, or (iii) as preliminary processing, recorded information must be erased using a recording apparatus or an erasing apparatus.

Therefore, in the conventional magnetooptical recording method, it is impossible to perform an over-write operation, which can properly record new information regardless of the presence/absence of recorded information.

If the direction of a bias field Hb can be desirably modulated between the "A-direction" and "non-A direction", an over-write operation is possible. However, it is impossible to modulate the direction of the bias field Hb at high speed. For example, if the bias field Hb comprises a permanent magnet, the direction of the magnet must be mechanically reversed. However, it is impossible to reverse the direction of the magnet at high speed. Even when the bias field Hb comprises an electromagnet, it is also impossible to modulate the direction of a large-capacity current at high speed.

However, according to remarkable technical developments, a magnetooptical recording method capable of performing an over-write operation by modulating only an intensity of a light beam to be irradiated in accordance with binary coded information to be recorded without modulating a strength (including an ON/OFF state) or the direction of the bias field Hb, an over-write capable magnetooptical recording medium used in this method, and an over-write capable recording apparatus used in this method were invented and filed as a patent application (Japanese Patent Laid-Open Application No. 62-175948 corresponding to DE 3,619,618 and to U.S. application Ser. No. 453,255). This invention will be quoted as the basic invention hereinafter.

Description of the Basic Invention

The basic invention uses an "over-write capable multilayered magnetooptical recording medium which includes a recording layer (to be referred to as a memory layer or M layer hereinafter in this specification) which comprises a perpendicularly magnetizable magnetic thin film, and a reference layer (to be referred to as a "writing layer" or w layer hereinafter in this specification) which comprises a perpendicularly-magnetizable magnetic thin film, and in which the two layers are exchange-coupled, and the direction of magnetization of only the W layer can be aligned in a predetermined direction without changing the direction of magnetization of the M layer at a room temperature".

Information is expressed by a mark having an "A-directed" magnetization, and a mark having a "non-A-directed" magnetization in the M layer (in some cases, also in the W layer).

In this medium, the direction of magnetization of the W layer can be aligned in an "A direction" by an external means (e.g., an initial field Hini.). At this time, the direction of magnetization of the M layer is not reversed. Furthermore, the direction of magnetization of the W layer which has been aligned in the "A direction" is not reversed upon application of an exchange coupling force from the M layer. In contrast to this, the direction of magnetization of the M layer is not reversed upon application of an exchange coupling force from the W layer aligned in the "A direction".

The W layer has a lower coercivity $H_C$ and a higher Curie temperature $T_C$ than those of the M layer.

According to a recording method of the basic invention, only the direction of magnetization of the W layer of the recording medium is aligned in the "A direction" by an external means until a time immediately before recording. This process will be specially referred to as "initialize" in this specification. The "initialize" process is unique to an over-write capable medium.

Thereafter, a laser beam which is pulse-modulated in accordance with binary coded information is irradiated on the medium. The laser beam intensity has high level $P_H$ and low level $P_L$. These high and low levels correspond to high and low levels of a pulse. Note that low level is higher than very low level* $P_R$ to be irradiated on the medium in a reproduction mode. Therefore, for example, an output waveform of a laser beam in the basic invention is as shown in FIG. 4.

Although not described in the specification of the basic invention, a recording beam need not always be a single beam but may be two proximity beams in the basic invention. More specifically, a leading beam may be used as a low-level laser beam (erasing beam) which is not modulated in principle, and a trailing beam may be used as a high-level laser beam (writing beam) which is modulated in accordance with information. In this case, the trailing beam is pulse-modulated between high level and base level (equal to or lower than low level, and its output may be zero). In this case, an output waveform is as shown in FIG. 5.

A bias field Hb whose direction and strength are not modulated is applied to a medium portion irradiated with the beam. The bias field Hb cannot be focused to a size as small as the portion irradiated with the beam (spot region), and a region where the bias field Hb is applied is considerably larger than the spot region.

When a low-level beam is radiated, a mark in one of the "A direction" and the "non-A direction" is formed in the M layer regardless of the direction of magnetization of a previous mark.

When a high-level beam is irradiated, a mark in the other direction is formed in the M layer regardless of the direction of magnetization of the previous mark.

Thus, the over-write operation is completed.

In the basic invention, a laser beam is pulse-modulated according to information to be recorded. However, this procedure itself has been performed in the conventional magnetooptical recording method, and a means for pulse-modulating the beam intensity on the basis of binary coded information to be recorded is a known means. For example, see "THE BELL SYSTEM TECHNICAL JOURNAL, Vol. 62 (1983), pp. 1923–1936 for further details. Therefore, the modulating means is available by partially modifying the conventional beam modulating means if required high and low levels of the beam intensity are given. Such a modification would be easy for those who are skilled in the art if high and low levels of the beam intensity are given.

One characteristic feature of the basic invention lies in high and low levels of the beam intensity. More specifically, when the beam intensity is at high level, "A-directed" magnetization of the W layer is reversed to the "non-A direction" by an external means such as a bias field (Hb) and the like, and a mark having the "non-A-directed" [or "A-directed"] magnetization is thus formed in the M layer by means of the "non-A-directed" magnetization of the W layer. When the beam intensity is at low level, the direction of magnetization of the W layer is left unchanged from the initialized state, and a mark having the "A-directed" [or "non-A-directed"] magnetization is formed in the M layer under the influence of the W layer (this influence is exerted on the M layer through the exchange coupling force).

In this specification, if expressions ooo [or ΔΔΔ] appear, ooo outside the parentheses in the first expression corresponds to ooo in the subsequent expressions ooo [or ΔΔΔ], and vice versa.

A medium used in the basic invention is roughly classified into first and second categories. In either category, a recording medium has a multilayered structure including the M and W layers.

The M layer is a magnetic layer, which exhibits a high coercivity at a room temperature, and has a low magnetization reversing temperature. The W layer is a magnetic layer, which exhibits a relatively lower coercivity at a room temperature and has a higher magnetization reversing temperature than those of the M layer. Note that each of the M and W layers may comprise a multilayered structure. If necessary, a third layer (e.g., an adjusting layer for an exchange coupling force $\sigma_w$) may be interposed between the M and W layers. See Japanese Patent Laid-Open Application No. 64-50257 and No. 1-273248. In addition, a clear boundary between the M and W layers need not be formed, and one layer can be gradually converted into the other layer.

In the first category, when the coercivity of the M layer is represented by $H_{C1}$; that of the W layer, $H_{C2}$; a Curie temperature of the M layer, $T_{C1}$; that of the W layer, $T_{C2}$; a room temperature, $T_R$; a temperature of the recording medium obtained when a laser beam at low level $P_L$ is irradiated, $T_L$; that obtained when a laser beam at high level $P_H$ is irradiated, $T_H$; a coupling field applied to the M layer, $H_{D1}$; and a coupling field applied to the W layer, $H_{D2}$, the recording medium satisfies Formula 1 below, and satisfies Formulas 2 to 5 at the room temperature:

$$T_R < T_{C1} \approx T_L < T_{C2} \approx T_H \quad \text{Formula 1}$$

$$H_{C1} > H_{C2} + |H_{D1} \mp H_{D2}| \quad \text{Formula 2}$$

$$H_{C1} > H_{D1} \quad \text{Formula 3}$$

$$H_{C2} > H_{D2} \quad \text{Formula 4}$$

$$H_{C2} + H_{D2} < |H_{ini.}| < H_{C1} \pm H_{D1} \quad \text{Formula 5}$$

In the above formulas, symbol "$\approx$" means "equal to" or "substantially equal to ($\pm 20°$ C.)". In addition, of double signs $\pm$ and $\mp$, the upper sign corresponds to an A (antiparallel) type medium, and the lower sign corresponds to a P (parallel) type medium (these media will be described later). Note that a ferromagnetic medium belongs to a P type.

The relationship between a coercivity and a temperature is as shown in the graph of FIG. 6. In FIG. 6, a thin curve represents the characteristics of the M layer, and a bold curve represents those of the W layer.

Therefore, when an external means, e.g., an initial field (Hini.) is applied to this recording medium at the room temperature, the direction of magnetization of only the W layer is reversed without reversing that of the M layer according to Formula 5. When the external means exerts an influence (e.g., the initial field (Hini.)) on the medium before recording, only the direction of magnetization of the W layer can be aligned in the "A direction". That is, the "initialize" process is performed. In the following description, the "A direction" is indicated by an upward arrow ↑ in this specification, and the "non-A direction" is indicated by a downward arrow ↓ for the sake of simplicity. If the initial field Hini. becomes zero, the direction of magnetization ↑ of the W layer can be left unchanged without being re-reversed according to Formula 4.

FIG. 7 schematically shows a state wherein only the W layer is magnetized by the external means in the "A direction" ↑ until a time immediately before recording.

In FIG. 7, the direction of magnetization* in the M layer represents previously recorded information. In the following description, since the direction of magnetization of the M layer can be disregarded, it is simply indicated by X, as shown in CONDITION 1 in FIG. 8.

In CONDITION 1, a high-level laser beam is radiated on the medium to increase a medium temperature to $T_H$. Since $T_H$ is higher than the Curie temperature $T_{C1}$, the magnetization of the M layer disappears. In addition, since $T_H$ is near the Curie temperature $T_{C2}$, the magnetization of the W layer also disappears completely or almost completely. The bias field Hb in the "A direction" or "non-A direction" is applied to the medium in accordance with a type of medium. The bias field Hb may be a stray field from the medium itself. For the sake of simplicity, assume that the bias field Hb in the "non-A direction" is applied to the medium. Since the medium is moving, a given irradiated portion is immediately separated apart from the laser beam, and is cooled. When the medium temperature is decreased under the presence of Hb, the direction of magnetization of the W layer is reversed to the "non-A direction" ↓ to follow Hb (CONDITION 2 in FIG. 8).

When the medium is further cooled and the medium temperature is decreased slightly below $T_{C1}$, magnetization of the M layer appears again. In this case, the direction of magnetization of the M layer is influenced by that of the W layer through a magnetic coupling (exchange coupling) force, and is aligned in a predetermined direction. As a result, a "non-A-directed" ↓ mark (the P type medium) or an "A-directed" ↑ mark (the A type medium) is formed according to the type of medium. This state corresponds to CONDITION 3 (P type) or 4 (A type) in FIG. 8.

A change in condition caused by the high-level laser beam will be called a high-temperature cycle herein.

A laser beam at low level $P_L$ is irradiated on the medium to increase the medium temperature to $T_L$. Since $T_L$ is near the Curie temperature $T_{C1}$, the magnetization of the M layer disappears completely or almost completely. However, since $T_L$ is lower than the Curie temperature $T_{C2}$, the magnetization of the W layer does not disappear. This state is represented by CONDITION 5 in FIG. 8. In this state, although the bias field Hb is unnecessary, it cannot be turned on or off at high speed (within a short period of time). Therefore, the bias field Hb in the high-temperature cycle is left applied inevitably.

However, since the $H_{C2}$ is kept high, the magnetization ↑ of the W layer will not be reversed by Hb. Since the medium is moving, a given irradiated portion is immediately separated apart from the laser beam, and is cooled. As cooling progresses, the magnetization of the M layer appears again. The direction of magnetization appearing in this case is influenced by the W layer through the magnetic coupling force, and is aligned in a predetermined direction. As a result, an "A-directed" ↑ mark (P type) or a "non-A-directed" ↓ mark (A type) is formed in the M layer according to the type of medium. This magnetization is left unchanged at the room temperature. This state corresponds to CONDITION 6 (P type) or 7 (A type) in FIG. 8.

A change in condition caused by the low-level laser beam will be called a low-temperature cycle herein.

As described above, "non-A-directed" ↓ and "A-directed" ↑ marks can be desirably formed by selecting the high- and low-temperature cycles independently of the direction of magnetization of the M layer before recording. More specifically, an over-write operation is enabled by pulse-modulating the laser beam between high level (high-temperature cycle) and low level (low-temperature cycle) in accordance with information. Refer to FIGS. 9A and 9B. FIGS. 9A and 9B illustrate directions of magnetization of P and A type media at the room temperature or formed when the medium temperature is returned to the room temperature.

In the above description, both the first and W layers have no compensation temperature $T_{comp.}$ between the room temperature and the Curie temperature. However, when the compensation temperature $T_{comp.}$ is present, if the medium temperature exceeds it, (1) the direction of magnetization is reversed (in practice, although the directions of sublattice magnetization of RE and TM atoms are not changed, since the relationship between their strengths is reversed, the direction of magnetization of the alloy is reversed), and (2) A and P types are reversed. For these reasons, a description must be complicated accordingly. In this case, the direction of the bias field Hb is opposite to the direction ↑ in the above description at the room temperature. That is, Hb in the same direction as the "initialized" direction ↓ of magnetization of the W layer is applied.

A recording medium normally has a disk shape, and is rotated during recording. For this reason, a recorded portion (mark) is influenced again by an external means, e.g., Hini. after recording. As g result, the direction of magnetization of the W layer is aligned in the original "A direction" ↑. In other words, the W layer is "initialized". However, at the room temperature, the magnetization of the W layer can no longer influence that of the M layer, and the recorded information can be held.

If linearly polarized light is irradiated on the M layer, since light reflected thereby includes information, the information can be reproduced as in the conventional magnetooptical recording medium.

A perpendicular magnetic film constituting each of the M and W layers is selected from the group consisting of (1) amorphous or crystalline ferromagnetic and ferrimagnetic materials having no compensation temperature and having a Curie temperature, and (2) an amorphous or crystalline ferrimagnetic material having both the compensation temperature and the Curie temperature.

The first category which utilizes the Curie temperature as the magnetization reversing temperature has been described. In contrast to this, the second category utilizes $H_C$ decreased at a temperature lower than the Curie temperature. In the second category, substantially the same description as the first category can be applied except that a temperature $T_{S1}$ at which the M layer is magnetically coupled to the W layer is used in place of $T_{C1}$ in the first category, and a temperature $T_{S2}$ at which the direction of magnetization of the W layer is reversed by Hb is used in place of $T_{C2}$.

In the second category, when the coercivity of the M layer is represented by $H_{C1}$; that of the W layer, $H_{C2}$; a temperature at which the M layer is magnetically coupled to the W layer, $T_{S1}$; a temperature at which the magnetization of the W layer is reversed by Hb, $T_{S2}$; a room temperature, $T_R$; a medium temperature obtained when a laser beam at low level $P_L$ is irradiated, $T_L$; that obtained when a laser beam at high level $P_H$ is irradiated, $T_H$; a coupling field applied to the M layer, $H_{D1}$; and a coupling field applied to the W layer, $H_{D2}$, the recording medium satisfies Formula 6 below, and satisfies Formulas 7 to 10 at the room temperature:

$$T_R < T_{S1} \approx T_L < T_{S2} \approx T_H \qquad \text{Formula 6}$$

$$H_{C1} < H_{C2} + |H_{D1} \mp H_{D2}| \qquad \text{Formula 7}$$

$$H_{C1} > H_{D1} \qquad \text{Formula 8}$$

$$H_{C2} > H_{D2} \qquad \text{Formula 9}$$

$$H_{C2} + H_{D2} < |Hini.| < H_{C1} \pm H_{D1} \qquad \text{Formula 10}$$

In the above formulas, of double signs ± and ∓, the upper sign corresponds to an A (antiparallel) type medium, and the lower sign corresponds to a P (parallel) type medium (these media will be described later).

In the second category, when the medium is at the high temperature $T_H$, the magnetization of the W layer does not disappear, but is sufficiently weak. The magnetization of the M layer disappears, or is sufficiently weak. Even if sufficiently weak magnetization is left in both the M and W layers, the bias field Hb ↓ is sufficiently large, and the Hb ↓ forces the direction of magnetization of the W layer and that of the M layer in some cases to follow that of the Hb ↓. This state corresponds to CONDITION 2 in FIG. 10.

Thereafter, the W layer influences the M layer via $\sigma_w$ (1) immediately or (2) when cooling progresses after irradiation of the laser beam is stopped and the medium temperature is decreased below $T_H$, or (3) when the irradiated portion is away from Hb, thereby aligning the direction of magnetization of the M layer in a stable direction. As a result, CONDITION 3 (P type) or 4 (A type) in FIG. 10 is established.

On the other hand, when the medium is at the low temperature $T_L$, both the W and M layers do not lose their magnetization. However, the magnetization of the M layer is relatively weak. In this case, there are two mark states, i.e., CONDITIONS D and 6 in FIG. 10 for P type, and there are also two mark states, i.e., CONDITIONs 7 and 8 in FIG. 10 for A type. In CONDITIONs 6 and 8, a magnetic wall (indicated by a bold line) is generated between the M and W layers, and the medium is in a relatively unstable (metastable) condition. The medium portion in this condition is applied with Hb ↓ immediately before it reaches the irradiation position of the laser beam. Nevertheless, CONDITION 6 or 8 can be maintained. Because, since the W layer has sufficient magnetization at the room temperature, the direction of magnetization of the W layer will not be reversed by Hb ↓. The M layer in CONDITION 8, whose direction of magnetization is opposite to Hb ↓, receives the influence of the exchange coupling force $\sigma_w$ larger than the influence of Hb ↓, and the direction of magnetization of the M layer is held in the same direction as that of the W layer since the medium is of P type.

Thereafter, the portion in CONDITION 6 or 8 is irradiated with a low-level laser beam. For this reason, the medium temperature is increased. Upon an increase in medium temperature, the coercivities of the two layers are decreased. However, since the W layer has a high Curie temperature, a decrease in coercivity $H_{C2}$ is small, and the "A direction" ↑ corresponding to the "initialized" direction of magnetization is maintained without being overcome with Hb ↓. On the other hand, since the medium temperature is lower than the Curie temperature $T_{C1}$ of the M layer although the M layer has the low Curie temperature, the coercivity $H_{C1}$ remains. However, since the coercivity $H_{C1}$ is small, the M layer receives (1) the influence of Hb ↓ and (2) the influence via the exchange coupling force $\sigma$ w from the W layer (force for aligning the direction of magnetization of the M layer in the same direction as that of the W layer in P type). In this case, the latter influence is stronger than the former influence, and the following formulas are simultaneously satisfied:

$$H_{C1} + Hb < \frac{\sigma_w}{2M_{S1}t_1}$$

and $$H_{C2} + Hb > \frac{\sigma_w}{2M_{S2}t_2}$$

The lowest temperature at which these formulas are simultaneously satisfied will be called $T_{LS}$. In other words, the lowest temperature at which the magnetic wall in CONDITION 6 or 8 disappears is $T_{LS}$.

As a result, CONDITION 6 transits to CONDITION 9, and CONDITION 8 transits to CONDITION 10. On the other hand, CONDITION 5 originally having no magnetic wall is the same as CONDITION 9, and CONDITION 7 is the same as CONDITION 10. Consequently, a mark in CONDITION 9 (P type) or 10 (A type) is formed upon irradiation of the low-level beam regardless of the previous state (CONDITION 5 or 6 for P type, or CONDITION 7 or 8 for A type).

This state is maintained when the medium temperature is decreased to the room temperature after the laser beam irradiation is stopped or the bit falls outside the irradiation position. CONDITION 9 (P type) or 10 (A type) in FIG. 10 is the same as CONDITION 6 (P type) or 7 (A type) in FIG. 8.

As can be understood from the above description, the low-temperature cycle is executed without increasing the medium temperature up to the Curie temperature $T_{C1}$ of the M layer.

Even when the low-temperature cycle is executed at a temperature equal to or higher than $T_{C1}$, since the medium temperature is increased from the room temperature to $T_{C1}$ via $T_{LS}$, CONDITION 6 transits to CONDITION 9 for P type, and CONDITION 8 transits to CONDITION 10 for A type at that time. Thereafter, the medium temperature reaches $T_{C1}$, and CONDITION 5 shown have no compensation temperature $T_{comp.}$ between the in FIG. 8 is established, In the above description, both the M and W layers when the compensation temperature $T_{comp.}$ is present, if room temperature and the Curie temperature. However, the medium temperature exceeds it, (1) the direction of magnetization is reversed, and (2) A and P types are reversed. For these reasons, a description must be complicated accordingly. In this case, the direction of the bias field Hb is opposite to the direction in the above description at the room temperature.

In both the first and second categories, the recording medium is preferably constituted by the M and W layers each of which comprises an amorphous ferrimagnetic material selected from transition metal (e.g., Fe, Co)—heavy rare earth metal (e.g., Gd, Tb, Dy, and the like) alloy compositions.

When the materials of both the M and W layers are selected from the transition metal-heavy rare earth metal alloy compositions, the direction and level of magnetization appearing outside the alloys are determined by the relationship between the direction and level of sublattice magnetization of transition metal (TM) atoms, and those of heavy rare earth metal (RE) atoms inside the alloys. For example, the direction and level of TM sublattice magnetization are represented by a vector indicated by a dotted arrow ⇡, those of RE sublattice magnetization are represented by a vector indicated by a solid arrow ↑ and the direction and level of magnetization of the entire alloy are represented by a vector indicated by a hollow arrow ⇑. In this case, the hollow arrow ⇑ (vector) is expressed as a sum of the dotted and solid arrows (vectors). However, in the alloy, the dotted and solid arrows (vectors) are directed in the opposite directions due to the mutual effect of the TM sublattice magnetization and the RE sublattice magnetization. Therefore, when strengths of these magnetizations are equal to each other, the sum of the dotted and solid arrows (vectors), i.e., the vector of the alloy is zero (i.e., the level of magnetization appearing outside the alloy becomes zero). The alloy composition making the vector of the alloy zero is called a compensation composition. When the alloy has another composition, it has a strength equal to a difference between the strengths of the two sublattice magnetizations, and has a hollow arrow (vector ↑ or ↓) having a direction equal to that of the larger vector. Thus, a magnetization vector of the alloy is expressed by illustrating dotted and solid vectors adjacent to each other, as shown in, e.g., FIG. 11. The RE and TM sublattice magnetization states of the alloy can be roughly classified into four states, as shown in FIGS. 12(1A) to 12(4A). Magnetization vectors (hollow arrow ↑ or ↓) of the alloy in the respective states are shown in FIGS. 12(1B) to 12(4B). For example, the alloy in the sublattice magnetization state shown in FIG. 12(1A) has a magnetization vector shown in FIG. 12(1B).

When one of the strengths of the RE and TM vectors is larger than the other, the alloy composition is referred to as "oo rich" named after the larger vector (e.g., RE rich).

Both the M and W layers can be classified into TM rich and RE rich compositions. Therefore, when the composition of the M layer is plotted along the ordinate and that of the W layer is plotted along the abscissa, the types of medium as a whole of the basic invention can be classified into four quadrants, as shown in FIG. 13. In FIG. 13, the intersection of the abscissa and the ordinate represents the compensation composition of the two layers.

The P type medium described above belongs to Quadrants I and III in FIG. 13, and the A type-medium belongs to Quadrants II and IV.

In view of a change in coercivity against a change in temperature, a given alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature ($T_{comp}$). At a temperature lower than the compensation temperature, the RE vector (solid arrow) is larger than the TM vector (dotted arrow) (i.e., TM rich), and vice versa at a temperature higher than the compensation temperature. Therefore, the compensation temperature of the alloy having the compensation composition is assumed to be present at the room temperature.

In contrast to this, no compensation temperature is present between the room temperature and the Curie temperature in the TM rich alloy composition. The compensation temperature below the room temperature is nonsense in the magnetooptical recording, and hence, it is assumed in this specification that the compensation temperature is present between the room temperature and the Curie temperature.

If the M and W layers are classified in view of the presence/absence of the compensation temperature, the medium can be classified into four types. A medium in Quadrant I includes all the four types of media. When both the M and W layers are classified in view of their RE or TM rich characteristics and in view of the presence/absence of the compensation temperature, recording media can be classified into the following nine classes.

TABLE 1

| Class | Type | |
|---|---|---|
| Quadrant I (P Type) | | |
| | M layer: RE Rich | W layer: RE Rich |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |
| Quadrant II (A type) | | |
| | M layer: | W layer: |

TABLE 1-continued

| Class | Type | |
|---|---|---|
| | RE Rich | TM Rich |
| 5 | $T_{comp.}$ | No $T_{comp.}$ | 3 |
| 6 | No $T_{comp.}$ | No $T_{comp.}$ | 4 |
| Quadrant III (P type) | | |
| | M layer: TM Rich | W layer: TM Rich |
| 7 | No $T_{comp.}$ | No $T_{comp.}$ | 4 |
| Quadrant IV (A type) | | |
| | M layer: TM Rich | W layer: TM Rich |
| 8 | No $T_{comp.}$ | $T_{comp.}$ | 2 |
| 9 | No $T_{comp.}$ | No $T_{comp.}$ | 4 |

Description of Class 1-1

The principle of the over-write operation will be described in detail below using a medium No. 1-1 belonging to a recording medium of Class 1 (P type, Quadrant I, and Type 1) shown in Table 1.

This medium No. 1-1 has the relations given by Formula 11:

$$T_r < T_{comp.1} < T_L < T_H \leq T_{C1} \leq T_{C2}$$

and, Formula 11-2:

$$T_{comp.2} < T_{C1}$$

In this specification, "=" of "≦" means "equal to" or "almost equal to" (about ±20° C.). For the sake of simplicity, a medium having a relation given by $T_H < T_{C1} < T_{C2}$ will be explained below. $T_{comp.2}$ may be higher than, equal to, or lower than $T_n$. However, for the sake of simplicity, $T_L < T_{comp.2}$. The above relations can be expressed by a graph shown in FIG. 14. Note that a thin curve represents the graph of an M layer, and a bold curve represents the graph of a W layer.

A condition that reverses only the direction of magnetization of the W layer by Hini. at room temperature $T_R$ without reversing that of the M layer is represented by Formula 12. This medium No. 1-1 satisfies Formula 12:

$$H_{C1} > H_{C2} + \frac{\sigma_w}{2M_{S1}t_1} + \frac{\sigma_w}{2M_{S2}t_2} \qquad \text{Formula 12}$$

where
$H_{C1}$: coercivity of M layer
$H_{C2}$: coercivity of W layer
$M_{S1}$: saturation magnetization of M layer
$M_{S2}$: saturation magnetization of W layer
$t_1$: film thickness of M layer
$t_2$: film thickness of W layer
$\sigma_w$: exchange coupling force=interface wall energy At this time, a condition for Hini. is represented by Formula 15. If Hini. disappears, the directions of magnetization of the M and W layers influence each other through an exchange coupling force. The conditions that can hold the directions of magnetization of the M and W layers without reversing them are represented by Formulas 13 and 14. The medium No. 1-1 satisfies Formulas 13 and 14:

$$H_{C1} > \frac{\sigma_w}{2M_{S1}t_1} \qquad \text{Formula 13}$$

$$H_{C2} > \frac{\sigma_w}{2M_{S2}t_2} \qquad \text{Formula 14}$$

The direction of magnetization of the W layer of the recording medium, which satisfies conditions given by Formulas 12 to 14 at room temperature, is oriented in, e.g., the "A direction" ↑ by Hini. which satisfies Formula 15 before a time immediately before recording:

$$H_{C2} + \frac{\sigma_w}{2M_{S2}t_2} < |Hini.| < H_{C1} - \frac{\sigma_w}{2M_{S1}t_1} \qquad \text{Formula 15}$$

At this time, the M layer is left in the recorded state. This condition corresponds to either CONDITION 1 or 2 in FIG. 15. CONDITION 1 or 2 is held until a time immediately before recording. Note that the bias field Hb is assumed to be applied in the "A direction" ↑.

Note that it is difficult to focus the bias field Hb to the same range as a region to be irradiated (spot region) of a laser beam as with normal magnetic fields. When a medium has a disk shape, recorded information (mark) is influenced by Hini. during one revolution of the medium, and is set in CONDITION 1 or 2 again. Thereafter, the mark passes a portion near the region to be irradiated (spot region) of the laser beam. At this time, the mark in CONDITION 1 or 2 is influenced by a bias field Hb apply means since it approaches the bias field Hb apply means. In this case, if the direction of magnetization of the M layer of the mark in CONDITION 2 having the direction of magnetization opposite to that of Hb is reversed by Hb, information recorded one revolution before is undesirably erased. A condition for preventing this is given by Formula 15-2:

$$H_{C1} > Hb + \frac{\sigma_w}{2M_{S1}t_1} \qquad \text{Formula 15-2}$$

The disk-shaped medium No. 1-1 must satisfy Formula 15-2 at room temperature. In other words, one condition for determining Hb is given by Formula 15-2.

The mark in CONDITION 1 or 2 then reaches the spot region of the laser beam. The laser beam intensity has two levels, i.e., high and low levels like in the basic invention.

Low-temperature Cycle

Upon irradiation with a low-level laser beam, the medium temperature is increased beyond $T_{comp.1}$. The medium type is then shifted from P type to A type. The relationship between the strengths of RE and TM spins of the M layer is reversed from FIG. 12(3A) to FIG. 12(4A) although the directions of the spins are left unchanged. For this reason, the direction of magnetization of the M layer is reversed from FIG. 12(3B) to FIG. 12(4B). As a result, the mark in CONDITION 1 in FIG. 15 transits to CONDITION 3, or the bit in CONDITION 2 transits to CONDITION 4.

The medium continues to be irradiated with the laser beam, and the medium temperature then reaches $T_L$. In this state, Formula 15-3 is satisfied:

$$H_{C1} + Hb < \frac{\sigma_w}{2M_{S1}t_1} \qquad \text{Formula 15-3}$$

As a result, even when Hb ↑ is present, the mark in CONDITION 4 in FIG. 15 transits to CONDITION 5. On the other hand, the mark in CONDITION 3 in FIG. 15 is maintained since Formula 15-3 is satisfied even when Hb ↑ is present. More specifically, CONDITION 3 merely transits to the same CONDITION 5 as CONDITION 3.

In this state, when the mark falls outside the spot region of the laser beam, the medium temperature begins to fall. When the medium temperature is decreased below $T_{comp.1}$, the medium type is restored from A type to original P type. The relationship between the strengths of RE and TM spins of the M layer is reversed from FIG. 12(2A) to FIG. 12(1A). For this reason, the direction of magnetization of the M layer is reversed from FIG. 12(2B) to FIG. 12(1B). As a result, the mark in CONDITION 5 transits to CONDITION 6 (the direction of magnetization of the M layer is oriented in the "A direction" ↑). CONDITION 6 is maintained even when the medium temperature is decreased to room temperature. In this manner, the mark in The "A direction" ↑ is formed in the M layer.

High-temperature Cycle

Upon irradiation with a high-level laser beam, the medium temperature is increased up to the low temperature $T_L$ via $T_{comp.1}$. As a result, the same CONDITION 7 as CONDITION 5 in FIG. 15 is established.

Since the medium is irradiated with the high-level laser beam, the medium temperature is further increased. When the medium temperature exceeds $T_{comp.2}$ of the W layer, the medium type is shifted from A type to P type. The relationship between the strengths of RE and TM spins of the W layer is reversed from FIG. 12(1A) to FIG. 12(2A) although the directions of the spins are left unchanged. For this reason, the direction of magnetization of the W layer is reversed from FIG. 12(1B) to FIG. 12(2B). As a result, the direction of magnetization of the W layer is oriented in the "non-A direction" ↓. This condition is CONDITION 8 in FIG. 15.

However, since $H_{C2}$ is still large at this temperature, the direction of magnetization of the W layer will not be reversed by ↑ Hb. When the temperature is further increased and reaches $T_H$, the coercivities of the M and W layers are decreased since their temperatures are close to the Curie temperature. As a result, the medium satisfies two formulas in one of the following conditions (1) to (3):

$$|H_{C1} - H_{C2}| < \frac{\sigma_w}{2M_{S1}t_1} + \frac{\sigma_w}{2M_{S2}t_2} \qquad (1)$$

$$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \qquad (2)$$

$$Hb > H_{C2} - \frac{\sigma_w}{2M_{S2}t_2}$$

$$Hb > H_{C1} - \frac{\sigma_w}{2M_{S1}t_1} \qquad (3)$$

-continued $$Hb > H_{C2} + \frac{\sigma_w}{2M_{S2}t_2}$$

For this reason, the directions of magnetization of the two layers are reversed at almost the same time, and follow the direction of Hb ↑. This condition corresponds to CONDITION 9 in FIG. 15.

When the mark falls outside the spot region of the laser beam, the medium temperature begins to fall. When the medium temperature is decreased below $T_{comp.2}$, the medium type is shifted from P type to A type. The relationship between the strengths of TM and RE spins is reversed from FIG. 12(4A) to FIG. 12(3A) although the directions of the spins are left unchanged. For this reason, the direction of magnetization of the W layer is reversed from FIG. 12(4B) to FIG. 12(3B). As a result, the direction of magnetization of the W layer is oriented in the "non-A direction" ↓. This condition is CONDITION 10 in FIG. 15. In CONDITION 10, the medium satisfies Formula 15-4:

$$Hb < H_{C2} + \frac{\sigma_w}{2M_{S2}t_2} \qquad \text{Formula 15-4}$$

For this reason, the direction of magnetization of the W layer will not be reversed even when Hb ↑ is applied to the W layer.

When the medium temperature is further decreased from the temperature in CONDITION 10 to a temperature below $T_{comp.1}$, the medium type is restored from A type to original P type. The relationship between the strengths of RE and TM spins of the M layer is reversed from FIG. 12(4A) to FIG. 12(3A). For this reason, the direction of magnetization of the M layer is reversed from FIG. 12(4B) to FIG. 12(3B). As a result, the direction of magnetization of the M layer is oriented in the "non-A direction" ↓. This condition is CONDITION 11 in FIG. 15.

The medium temperature is then decreased from the temperature in CONDITION 11 to room temperature. Since $H_{C1}$ at room temperature is sufficiently large (see Formula 15-5), the direction of magnetization ↓ of the M layer will not be reversed by ↑ Hb, and CONDITION 11 is maintained.

$$Hb < H_{C1} + \frac{\sigma_w}{2M_{S1}t_1} \qquad \text{Formula 15-5}$$

In this manner, the bit in the "non-A direction" ↓ is formed in the M layer.

Description of Selection Invention

In the above description, a two-layered film consisting of the M and W layers has been exemplified. An over-write operation is enabled even in a medium including a multi-layered film consisting of three or more layers as long as the medium has the above-mentioned two-layered film. In particular, in the above description, the initial field Hini. is used as the external means. However, in the basic invention, any other external means may be employed. That is, the direction of magnetization of the W layer need only be aligned in a predetermined direction before a time immediately before recording.

For this reason, a structure using, as an external means, an exchange coupling force from an initializing layer in place of Hini. was invented (Japanese Journal "OPTRONICS", 1990, No. 4, pp. 227–231; International Application Laid-Open WO 90/02400 for further details). This invention will be referred to as a selection invention hereinafter. The selection invention will be described below.

FIG. 16 shows a structure of a medium according to the alternative invention. This medium comprises a substrate and a magnetic film founded on the substrate. The magnetic film has a four-layered structure constituted by sequentially stacking an M layer 1 consisting of a perpendicularly magnetizable magnetic thin film, a W layer 2 consisting of a perpendicularly magnetizable magnetic thin film, a switching layer (to be referred to as an S layer hereinafter; also referred to as a control layer in the above-mentioned journal "OPTRONICS") 3 consisting of a perpendicularly magnetizable magnetic thin film, and an initializing layer (to be referred to as an I layer hereinafter) 4 consisting of a perpendicularly magnetizable magnetic thin film (in some cases, the S layer 3 may be omitted). The M and W layers are exchange-coupled to each other, and the direction of magnetization of only the W layer can be aligned in a predetermined direction without changing the direction of magnetization of the M layer at a room temperature. In addition, the W and I layers are exchange-coupled to each other via the S layer at a temperature equal to or lower than a Curie temperature of the S layer.

The I layer has a highest Curie temperature, and does not lose its magnetization upon radiation of a high-level laser beam. The I layer always holds magnetization in a predetermined direction, and serves as means for repetitively "initializing" the W layer to prepare for the next recording every time recording is performed. For this reason, the I layer is called the initializing layer.

However, in a process of a high-temperature cycle (e.g., near $T_H$), the magnetization of the W layer must be reversed. In this case, the influence from the I layer must become negligibly small. When the temperature is increased, an exchange coupling force $\sigma_{w24}$ between the W and I layers can be conveniently decreased.

However, when sufficient $\sigma_{w24}$ remains even at $T_H$, the S layer is required between the W and I layers. If the S layer consists of a non-magnetic member, $\sigma_{w24}$ can be reduced to zero or can become very small. However, $\sigma_{w24}$ must be large enough to "initialize" the W layer at a certain temperature between $T_H$ and the room temperature. In this case, the S layer must apply an apparently sufficient exchange coupling force between the W and I layers. For this purpose, the S layer must consist of a magnetic member. Therefore, the S layer is converted to a magnetic member at a relatively low temperature to apply an apparently sufficient exchange coupling force $\sigma_{w24}$ between the W and I layers, and is converted to a non-magnetic member at a relatively high temperature to apply a zero or very small exchange coupling force $\sigma_{w24}$ between the W and I layers. For this reason, the S layer is called the switching layer.

The principle of a four-layered film over-write operation will be described below with reference to FIG. 16. A typical example will be described below, but there are some examples in addition to this example. A hollow arrow indicates a direction of magnetization of each layer.

A condition before recording corresponds to either CONDITION 1 or CONDITION 2. Paying attention to an M layer, in CONDITION 1, an "A-directed"

mark ($B_1$) is formed, or in CONDITION 2, a "non-A-directed" mark ($B_0$) is formed, a magnetic wall (indicated by a bold line) is present between the M layer and a W layer, and the medium is in a relatively unstable (metastable) state.

Low-Temperature Cycle

A laser beam is irradiated on the mark in CONDITION 1 or 2 to increase a temperature. First, magnetization of an S layer disappears. For this reason, CONDITION 1 transits to CONDITION 3, or CONDITION 2 transits to CONDITION 4.

When the temperature is further increased, and reaches $T_{LS}$, the magnetization of the M layer is weakened, and the influence from the W layer via an exchange coupling force is strengthened. As a result, the direction of magnetization of the M layer in CONDITION 4 is reversed, and at the same time, the magnetic wall between the two layers disappears. This condition corresponds to CONDITION 5. The mark in CONDITION 3 originally has no magnetic wall between the two layers, and directly transits to CONDITION 5.

When irradiation of the laser beam is stopped or an irradiated portion is separated from the irradiation position, the temperature of the mark in CONDITION 5 begins to fall, and CONDITION 1 is then established via CONDITION 3.

This is the low-temperature cycle.

When the temperature is further increased from that in CONDITION 5, and exceeds the Curie temperature of the M layer, magnetization disappears, and CONDITION 6 is established. When irradiation of the laser beam is stopped or an irradiated portion is separated from the irradiation position, the temperature of the mark in CONDITION 6 begins to fall, and then reaches a temperature slightly lower than the Curie temperature of the M layer. Thus, magnetization appears in the M layer. In this case, the direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 5 is reproduced. The temperature is further decreased, and CONDITION 3 is established accordingly. Thereafter, a mark in CONDITION 1 is formed. This process is another example of the low-temperature cycle.

High-Temperature Cycle

When a laser beam is irradiated on the mark in CONDITION 1 or 2 to increase a temperature, CONDITION 6 is established via CONDITION 5, as described above.

When the temperature is further increased, the coercivity of the W layer is decreased considerably. For this reason, the direction of magnetization of the W layer is reversed by a bias field Hb ↓. This is CONDITION 8.

When irradiation of the laser beam is stopped or an irradiated portion is separated from the irradiation position, the medium temperature begins to fall. The medium temperature then reaches a temperature slightly lower than the Curie temperature of the M layer. Thus, magnetization appears in the M layer. The direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 9 appears.

When the temperature is further decreased, magnetization appears in the S layer. As a result, the W layer and an I layer are magnetically coupled (by the exchange coupling force). As a result, the direction of magnetization of the W layer is aligned in a stable direction with respect to the direction of magnetization of the I layer (i.e., in a direction not to form a magnetic wall between the layers). Since the medium is of P type, the direction of magnetization of the W layer is reversed to the "A direction", and as a result, an interface wall is formed between the M and W layers. This condition is maintained at the room temperature, and a mark in CONDITION 2 is formed.

This is the high-temperature cycle.

When the temperature is further increased after CONDITION 8 appears by the bias field Hb ↓, the temperature then exceeds the Curie temperature of the W layer. As a result, CONDITION 7 appears.

When irradiation of the laser beam is stopped or an irradiated portion is separated from the irradiation position, the medium temperature begins to fall. The medium temperature then reaches a temperature slightly lower than the Curie temperature of the W layer. Thus, magnetization appears in the W layer. The direction of magnetization of the W layer follows the direction of the bias field Hb ↓. As a result, CONDITION 8 appears.

When the temperature is further decreased, a mark in CONDITION 2 is formed via CONDITION 9. This process is another example of the high-temperature cycle.

Over-write Operation

As described above, a bit ($B_1$) in CONDITION 1 is formed in the low-temperature cycle, and a mark ($B_0$) in CONDITION 2 is formed in the high-temperature cycle independently of a previous recording state. Therefore, an over-write operation is enabled.

Problems to be Solved by the Invention

The high level $P_H$ and the low level $P_L$ will be examined below with reference to FIG. 17. Theoretically speaking, $P_L$ is lower than $P_H$. More specifically, when $P_L$ and $P_H$ are considered as variables, $P_L$ and $P_H$ must be selected from a region on the lower right side of a line $P_L = P_H$ shown in FIG. 17. When $P_L$ is too high, since a high-temperature cycle occurs, $P_L$ must be lower than a predetermined value $P_{Lmax}$. On the contrary, when $P_H$ is too low, since the high-temperature cycle does not occur, $P_H$ must be higher than a predetermined limit value $P_{Hth}$. In this case, $P_{Lmax}$ is equal to $P_{Hth}$, and these values are indicated by $P_{Hth}$ in FIG. 17. Furthermore, as $P_H$ becomes higher, since a mark $B_1$ (or $B_0$) formed by $P_H$ becomes thicker, $P_L$ must be set to be higher accordingly so as not to form an unerased portion when the mark is erased by $P_L$ (the other mark $B_0$ (or $B_1$) is formed by $P_L$). Therefore, when $P_L$ and $P_H$ are considered as variables, $P_L$ and $P_H$ must be selected from a region on the upper left side of a line $P_L = a \cdot P_H$ (a is a constant) shown in FIG. 17. To summarize, $P_L$ and $P_H$ must be selected as values of points present in a triangular region defined by points A, B, and C shown in FIG. 17.

In this case, the C/N ratio varies depending on selected points ($P_L$ and $P_H$). When the same C/N ratios are plotted, curves $R_1, R_2, R_3, ...$ approximate to parabolas are obtained, as shown in FIG. 17. Since too low a C/N ratio is not practical, a predetermined C/N ratio (given by the curve $R_1$ in this case) or higher is required. Therefore, practical $P_L$ and $P_H$ must be selected from an AND set (overlapping region; a hatched portion in FIG. 17) of the triangular region defined by the points A, B, and C shown in FIG. 17, and a region surrounded by the curve $R_1$. Although further conditions are added in practice, the power margin of $P_L$ and $P_H$ is defined by this AND set in this specification.

The prior art suffers from the first problem, i.e., a small power margin.

For this reason, a magnetooptical recording apparatus used in the conventional method is required to have very high precision and accuracy in laser control for determining $P_L$ and $P_H$. This also poses the second problem. That is, a high-grade, expensive control circuit is required. Of course, $P_L$ and $P_H$ must be changed depending on the environmental temperature condition.

Contrarily speaking, assuming a case wherein a magnetooptical recording apparatus having no high-grade, expensive control circuit is to be used, the allowable variation range of recording sensitivity (with respect to $P_L$ and $P_H$) among individual media is narrow, and the yield of recording media is decreased, thus posing the third problem.

In addition, since the laser control requires very high precision and accuracy, the ratio of production of defective magnetooptical recording apparatus is increased, and the productivity is decreased, thus posing the fourth problem.

Needless to say, many other problems arise from these first to fourth problems.

SUMMARY OF THE INVENTION

It is an object of the present invention to widen the power margin.

According to the first aspect of the present invention, there is provided an over-write capable magnetooptical recording method comprising the steps of: (1) preparing an "over-write capable multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction"; (2) rotating the medium; (3) irradiating a laser beam onto the medium; (4) pulse-modulating an intensity of the laser beam between a high level $P_H$ and a low level $P_L$ according to binary coded information to be recorded; and (5) applying a bias field to a radiation position of the laser beam, wherein after mark formation based on the beam at the high level $P_H$ is started, the level is slightly decreased to continue the mark formation.

According to the second aspect of the present invention, there is provided an over-write capable magnetooptical recording apparatus comprising: (1) rotating means for rotating a magnetooptical recording medium; (2) a laser beam light source; (3) a light source drive circuit for pulse-modulating an intensity of a laser beam between a high level $P_H$ and a low level $P_L$ according to binary coded information to be recorded; and (4) bias field applying means, wherein the apparatus is added with a pulse waveform shaping circuit, which slightly decreases the high level $P_H$ to continue mark formation after mark formation based on the high level $P_H$ is started.

According to the third aspect of the present invention, there is provided an over-write capable magnetooptical recording method having improved ease of discrimination of data, comprising the steps of:

(1) preparing an "over-write capable multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction";

(2) rotating the medium;

(3) irradiation a laser beam onto the medium;

(4) pulse-modulating an intensity of the laser beam between a high level $P_H$ and a low level $P_L$ according to binary coded information to be recorded; and (5) applying a bias field to an irradiation position of the laser beam, wherein when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level $P_H$, the intensity of the laser beam is decreased to continue the mark formation after mark formation based on the high level $P_H$ is started, and the intensity is returned to the low level $P_L$ after the mark formation.

According to the fourth aspect of the present invention, there is provided an over-write capable magnetooptical recording method having improved ease of discrimination of data, comprising the steps of:

(1) preparing an "over-write capable multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction";

(2) rotating the medium;

(3) irradiating a laser beam onto the medium;

(4) pulse-modulating an intensity of the laser beam between a high level $P_H$ and a low level $P_L$ according to binary coded information to be recorded; and (5) applying a bias field to an irradiation position of the laser beam, wherein when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, the intensity of the laser beam is increased from the low level $P_L$ to the high level $P_H$, the intensity of the laser beam is decreased to continue the mark formation after mark formation based on the high level $P_H$ is started, and after the mark formation, the intensity is temporarily decreased below the limit value $P_{Lmin}$ and is returned to the low level $P_L$.

According to the fifth aspect of the present invention, there is provided an over-write capable magnetooptical recording method having improved ease of discrimination of data, comprising the steps of:

(1) preparing an "over-write capable multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction";

(2) rotating the medium;

(3) irradiating a laser beam onto the medium;

(4) pulse-modulating an intensity of the laser beam between a high level $P_H$ and a low level $P_L$ according to binary coded information to be recorded; and (5) applying a bias field to a radiation position of the laser beam, wherein when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level the intensity of the laser beam is decreased to continue the mark formation after mark formation based on the high level $P_H$ is started, and after the mark formation, when the intensity is decreased to the low level $P_L$, the intensity is temporarily decreased below the limit value $P_{Lmin}$ and is then returned to the low level $P_L$.

According to the sixth aspect of the present invention, there is provided an over-write capable magnetooptical recording apparatus comprising:

(1) rotating means for rotating a magnetooptical recording medium;

(2) a laser beam light source;

(3) a light source drive circuit for pulse-modulating an intensity of a laser beam between a high level $P_H$ and a low level $P_L$ according to binary coded information to be recorded; and (4) bias field applying means, wherein the apparatus is added with a pulse waveform shaping circuit, in which when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level $P_H$, the intensity of the laser beam is decreased to continue the mark formation after mark formation based on the high level $P_H$ is started, and the intensity is returned to the low level $P_L$ after the mark formation.

According to the seventh aspect of the present invention, there is provided an over-write capable magnetooptical recording apparatus comprising:

(1) rotating means for rotating a magnetooptical recording medium;

(2) a laser beam light source;

(3) a light source drive circuit for pulse-modulating an intensity of a laser beam between a high level $P_H$ and a low level $P_L$ according to binary coded information to be recorded; and (4) bias field applying means, wherein the apparatus is added with a pulse waveform shaping circuit, in which when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, the intensity of the laser beam is increased from the low level $P_L$ to the high level $P_H$, the intensity of the laser beam is decreased to continue the mark formation after mark formation based on the high level $P_H$ is started, and after the mark formation, the intensity is temporarily decreased below the limit value $P_{Lmin}$ and is returned to the low level $P_L$.

According to the eighth aspect of the present invention, there is provided an over-write capable magnetooptical recording apparatus comprising:

(1) rotating means for rotating a magnetooptical recording medium;

(2) a laser beam light source;

(3) a light source drive circuit for pulse-modulating an intensity of a laser beam between a high level $P_H$ and a low level $P_L$ according to binary coded information to be recorded; and (4) bias field applying means, wherein the apparatus is added with a pulse waveform shaping circuit, in which when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level the intensity of the laser beam is decreased to continue the mark formation after mark formation based on the high level $P_H$ is started, and after the mark formation, when the intensity is decreased to the low level $P_L$, the intensity is temporarily decreased below the limit value $P_{Lmin}$ and is then returned to the low level $P_L$.

BRIEF DESCRIPTION OF THE DRAWINGS

FIG. 6 is a graph showing the relationship between a coercivity and a temperature of first and second layers of an overwrite-capable magnetooptical recording medium;

FIG. 7 is a schematic view showing directions of magnetization of the first and second layers;

FIG. 8 is a diagram showing changes in direction of magnetization of the first and second layers;

FIG. 10 is a diagram showing changes in direction of magnetization of the first and second layers;

FIGS. 30A to 30C are waveform charts of standard information to be recorded according to the embodiment of the present invention;

DETAILED DESCRIPTION OF THE PREFERRED EMBODIMENT

The present invention will be described in detail below by way of its example. However, the present invention is not limited to this.

Embodiment 1: Magnetooptical Recording Apparatus

Figure 18:
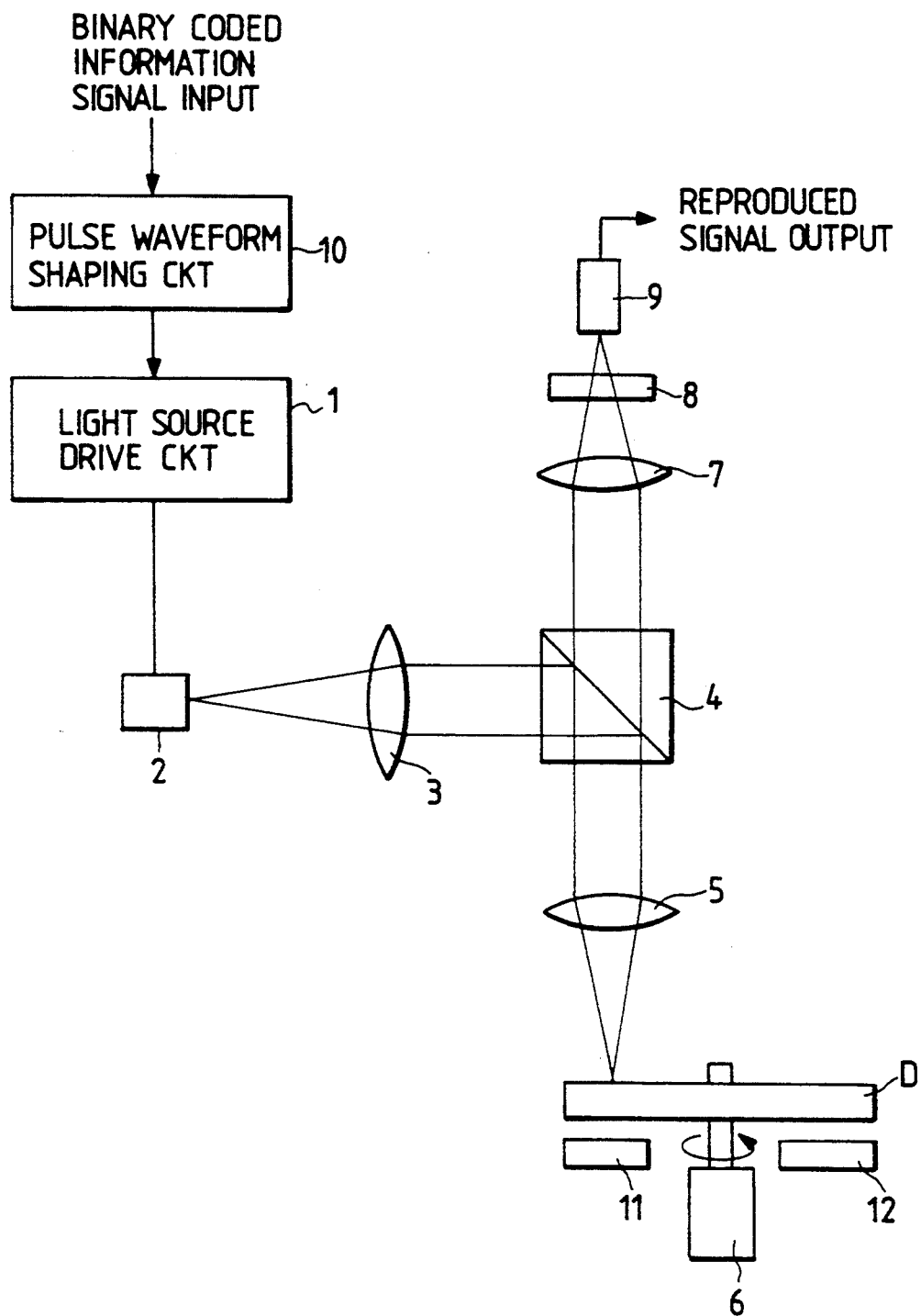
FIG. 18 is a schematic diagram showing the overall arrangement of a magnetooptical recording apparatus according to an embodiment of the present invention.

FIG. 18 is a schematic diagram showing the arrangement of a main part of a magnetooptical recording apparatus according to this embodiment. This apparatus also serves as a reproduction apparatus, and mainly comprises a motor (rotating means 6) for rotating a magnetooptical recording medium (D), a laser beam light source (2), a light source drive circuit (1) for pulse-modulating the laser beam intensity between a high level $P_H$ and a low level $P_L$ according to binary coded information to be recorded, a bias field applying means (a permanent magnet 11 having Hb=300 Oe on the magnetic film of the medium), a pulse waveform shaping circuit (10), which slightly decreases the high level $P_H$ after mark formation is started by a beam of the high level $P_H$ so as to continue the mark formation, and an initial field applying means (a permanent magnet 12 having Hini.=3 kOe on the magnetic film of the medium). The direction of Hb is the same as that of Hini.

The medium rotated by the rotating means (6) is "initialized" by passing above the magnet (12). An "initialized" W layer portion then reaches the radiation position of the laser beam. When a medium having an I layer is used, the magnet (12) is not necessary.

The laser beam emitted from the light source (2) is collimated through a collimator lens (3), and is then reflected by a beam splitter (4). The reflected beam is focused by an objective lens (5), and forms a focal point on the medium (D). Thus, recording is basically ended. In a reproduction mode, a non-modulated (DC-ON) laser beam having a lower intensity is radiated on the medium (D) in the same manner as in a recording mode. Light reflected by the medium is incident on the beam splitter (4) through the objective lens (5), and light transmitted through the beam splitter (4) is focused by a focusing lens (7). Thereafter, the light is incident on a detector (9). At this time, the rotation condition ($+\theta k$ and $-\theta k$) of the plane of polarization is converted into a change in light intensity through an analyzer (polarizer) arranged between the focusing lens (7) and the detector (9). Thus, recorded information of the medium (D), which is read as rotation of the plane of polarization is converted into a change in light intensity. The change in light intensity is converted into an electrical signal level by the detector (9). This is the reproduction operation.

Embodiment 2: Magnetooptical Recording (1) Preparation of Medium (Class 1)

A substrate obtained by forming a 0.03-mm thick 2P resin layer on a 1.2-mm thick glass disk having a diameter of 130 mm is prepared. A large number of tracking grooves are concentrically formed within a region of a radius $r=30$ to 60 mm on the 2P resin layer. Each groove has a depth $h=700$ Å, a groove width $W=0.5$ μm, and a pitch$=1.6$ μm. The following six layers are formed on the 2P resin layer by sputtering: ① a 700-Å thick silicon nitride layer as a protection layer; ② a 250-Å thick $Tb_{23}Fe_{72}Co_5$ layer (note that suffices are in units of atomic %; the same applies to the following description) as an M layer; ③ a 100-Å thick $Gd_{23}Fe_{21}Co_5$ layer as an exchange coupling force adjustment layer; ④ a 500-Å thick $Dy_{28}Fe_{36}Co_{36}$ layer as a W layer; ⑤ a 100-Å thick silicon nitride thin film as a protection layer; and ⑥ a 700-Å thick silicon nitride thin film as a protection layer. Finally, a protection substrate is adhered on the protection layer ⑥, thus finishing the medium. The protection substrate is formed of the same material as the glass disk used in the substrate.

When an A-directed magnetic field of 23 kOe is applied to this medium, the directions of magnetization of both the M and W layers are aligned in the A direction ("initialized").

(2) Information to be Recorded

Figure 19:
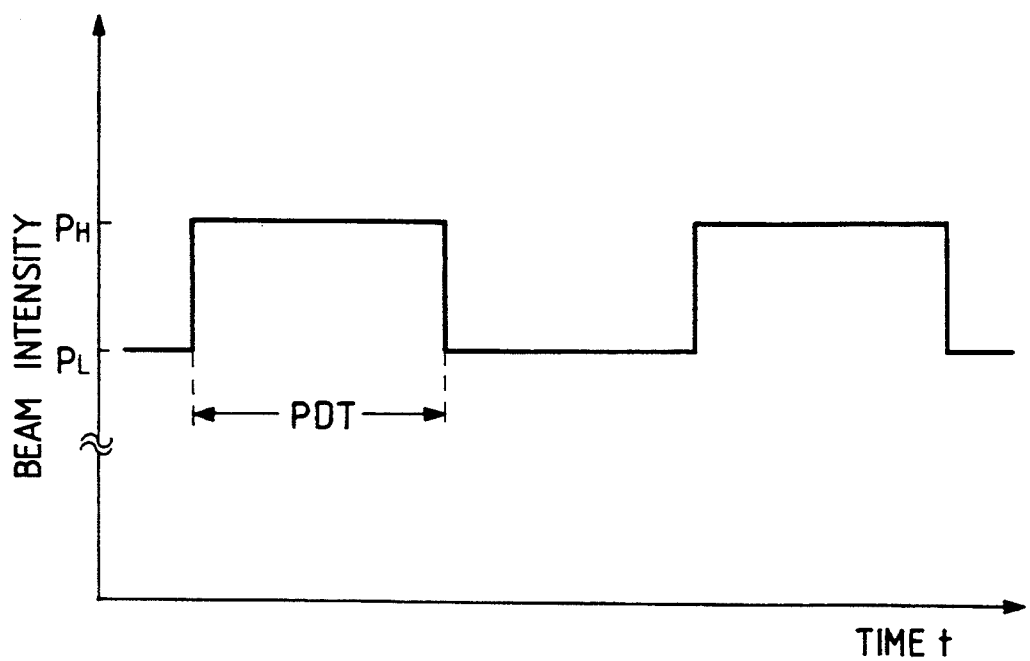
FIG. 19 is an explanatory view for explaining PDT.

Information to be recorded is standard information. Six kinds of standard information $T_3$, $T_4$, $T_5$, $T_6$, $T_7$, and $T_8$ are prepared. Each standard information $T_n$ (n is an integer ranging between 3 and 8) is a rectangular wave having a duty ratio of 50%, and frequency $f_n = 1(2 \times T_n)$ Hz. The PDT per pulse of the rectangular wave is an n times of 24 nsec. The PDT means the pulse duration time, as will be described later with reference to FIG. 19 That is, $f_n = 2 \times n \times 24 \times 10^3$ Hz.

(3) Measurement of $P_{Hth}$

The above-mentioned medium (D) is set in the apparatus of Embodiment 1, and is rotated at 3,600 rpm In this state, a laser beam is radiated at a position of the radius $r=30$ mm to record information. As information to be recorded, the standard information having a sufficiently large pulse width is selected. At this time, sufficiently low $P_L$ is set, and recording is repeated while changing $P_H$. Every time information is recorded, it is reproduced. Thus, if even a very weak signal is reproduced in a reproduction mode, it is determined that a mark is formed by $P_H$, and the lowest value $P_H$ is determined as $P_{Hth}$. The medium (D) had $P_{Hth}=7.5$ mW.

(4) Measurement of a

Figure 20:
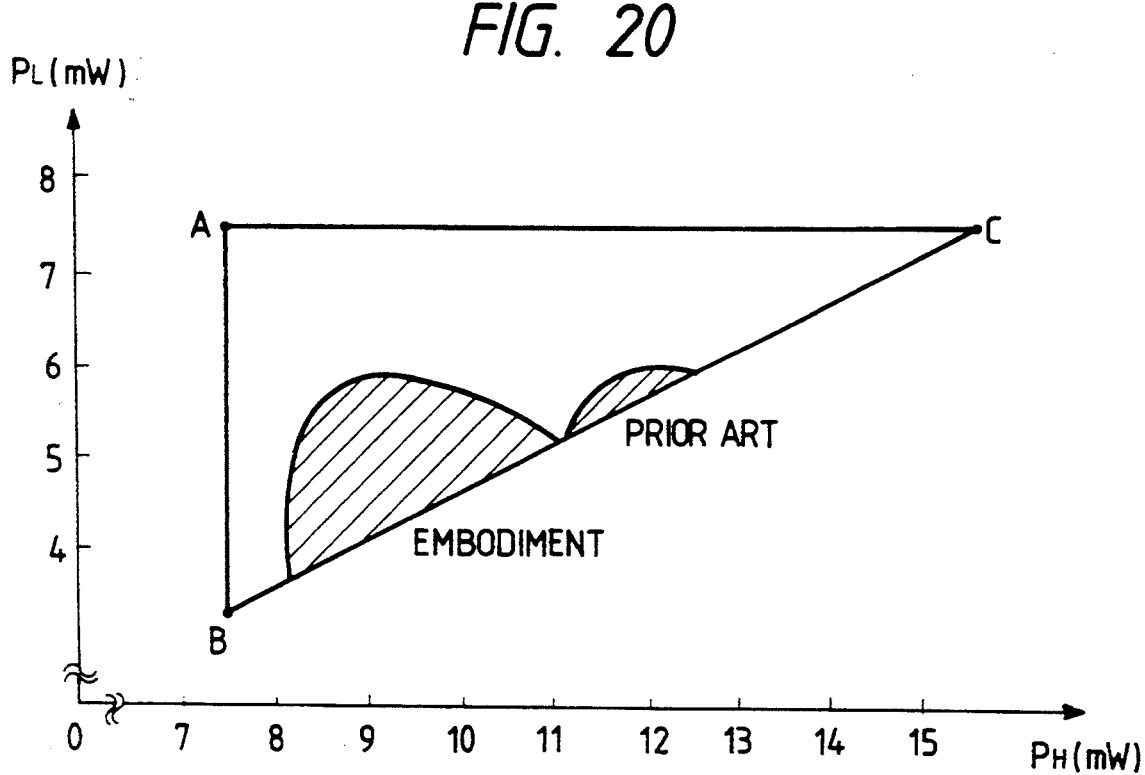
FIG. 20 is an explanatory view for explaining a power margin in the embodiment.
Figure 21A:
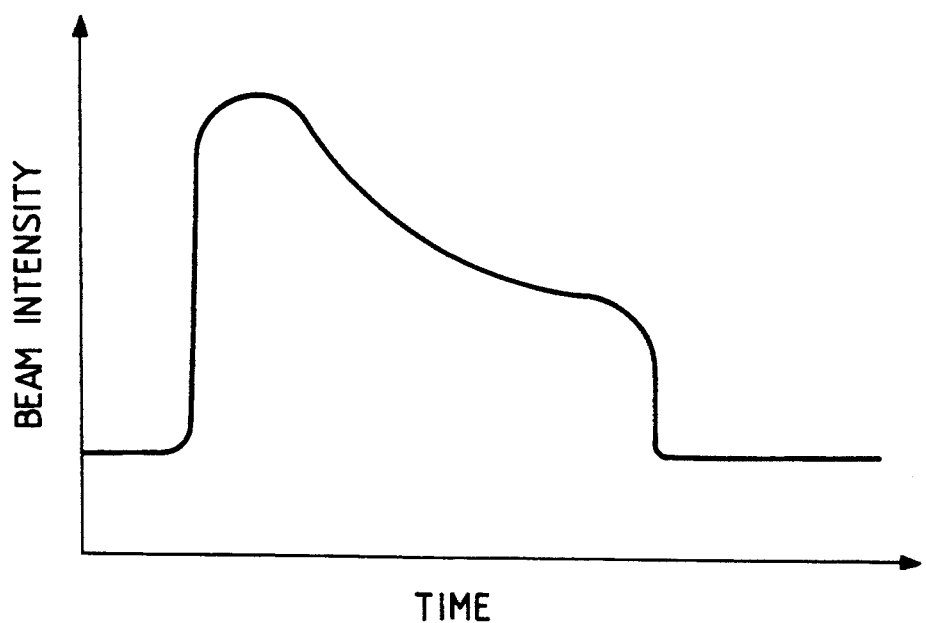
FIGS. 21A and 21B are waveform charts showing shaped waveforms according to another embodiment of the present invention.
Figure 21B:
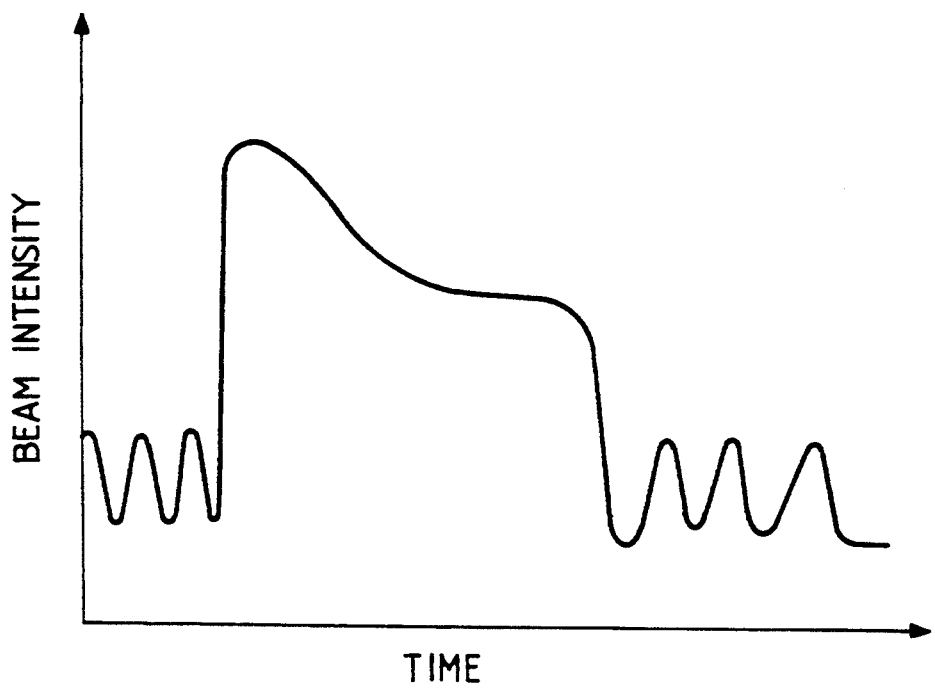
Figure 22A:
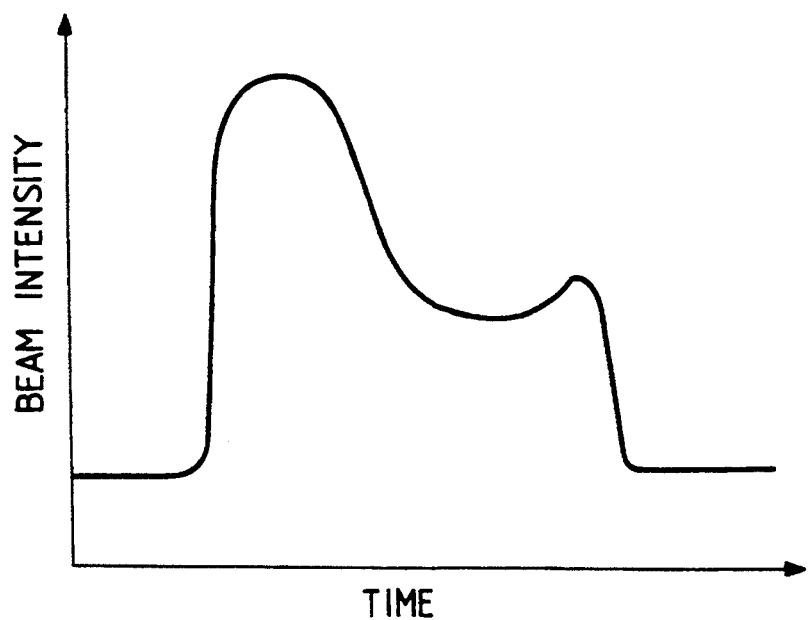
FIGS. 22A and 22B are waveform charts showing shaped waveforms according to still another embodiment of the present invention.
Figure 22B:
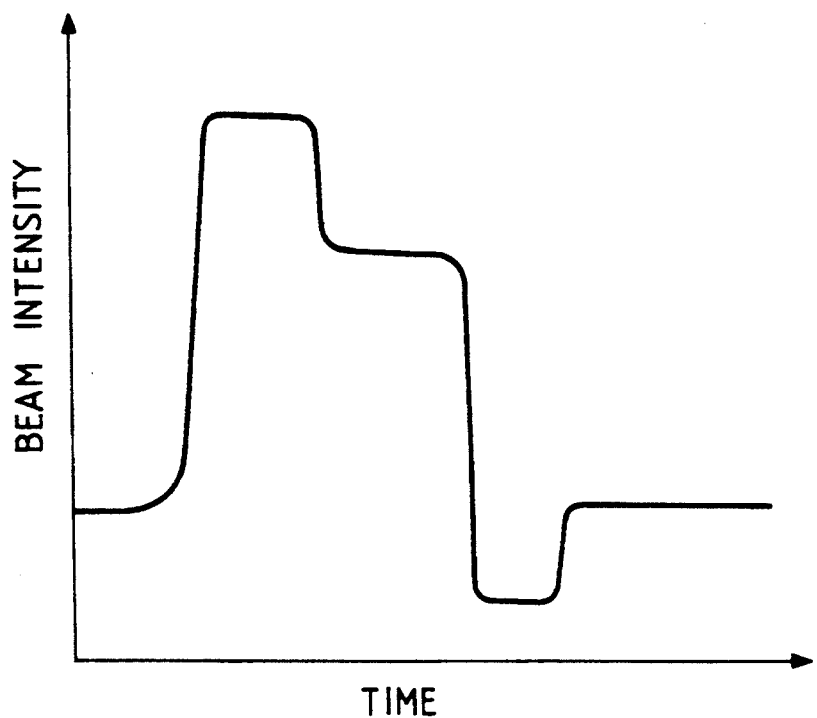
Figure 23A:
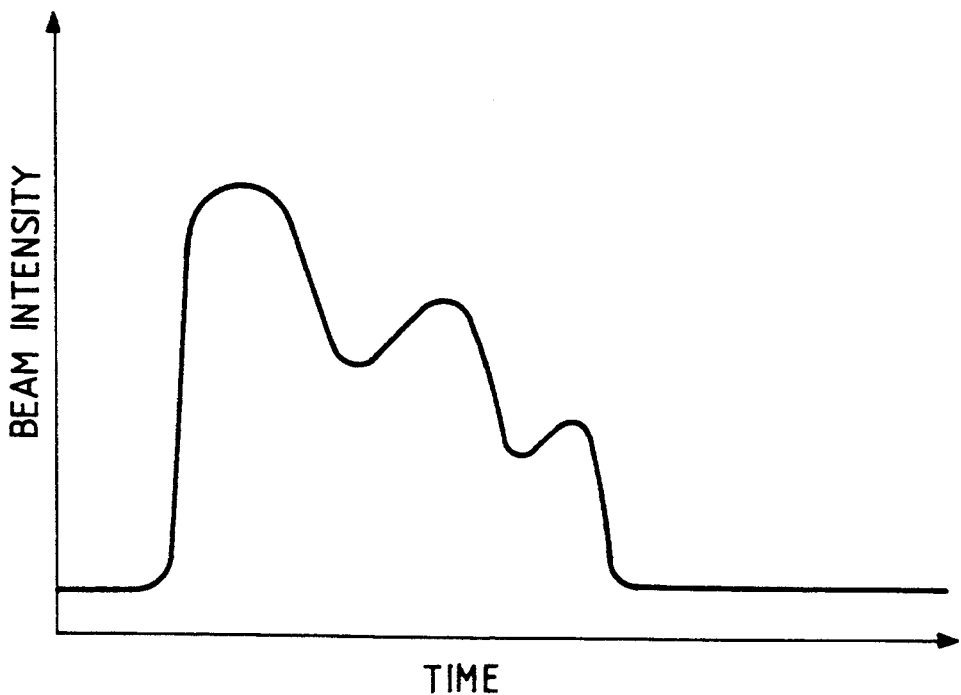
FIGS. 23A and 23B are waveform charts showing shaped waveforms according to still another embodiment of the present invention.
Figure 23B:
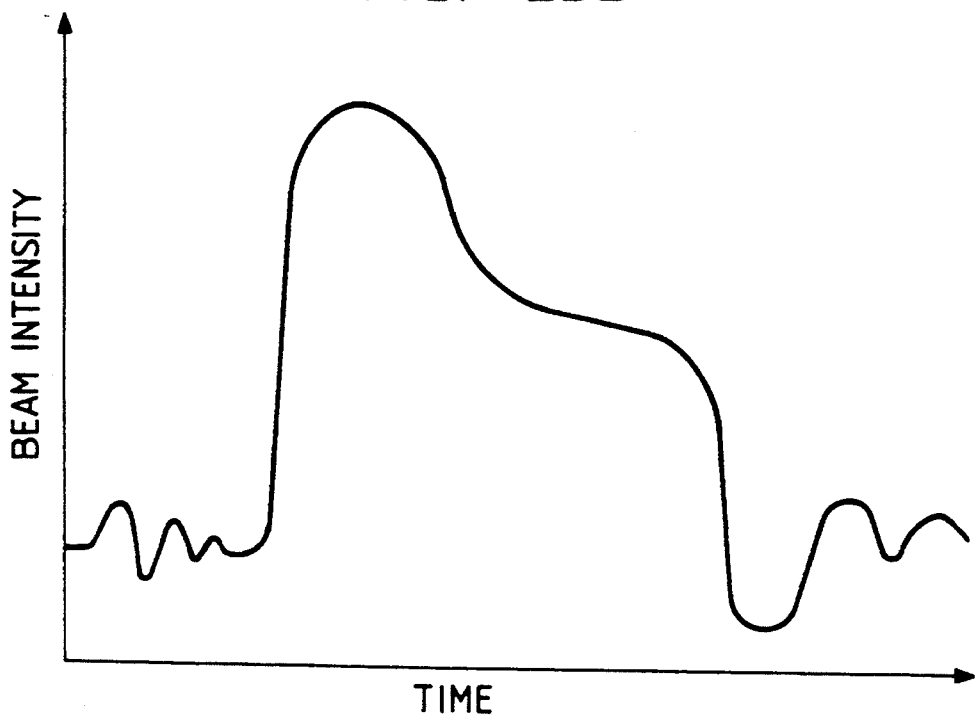
Figure 24:
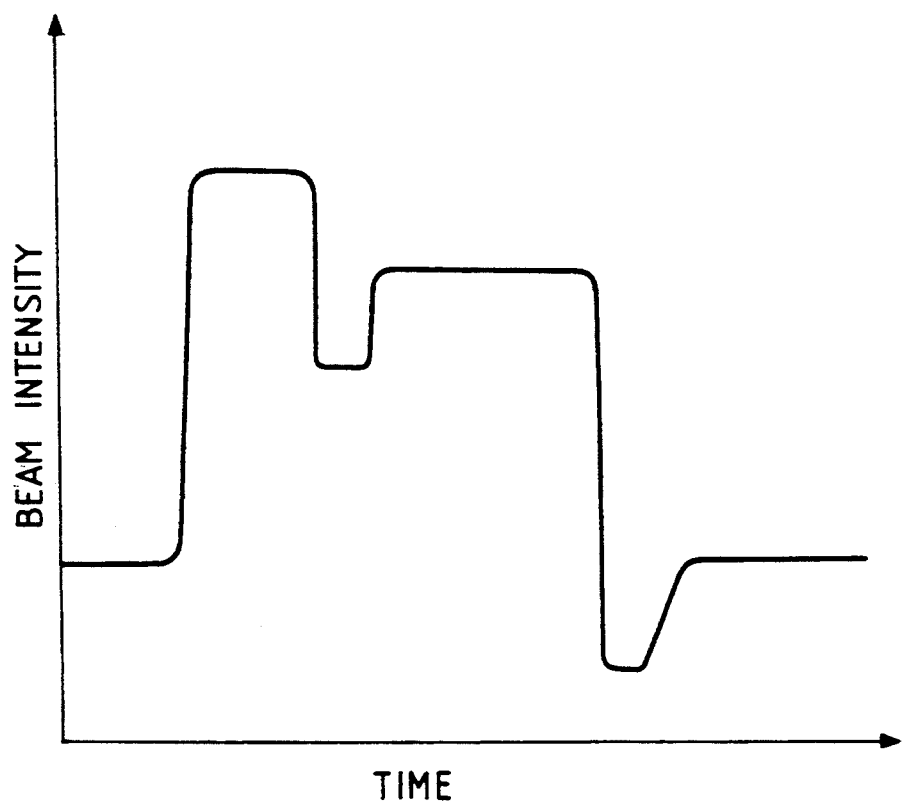
FIG. 24 is a waveform chart showing a shaped waveform according to still another embodiment of the present invention.

"a" in relation: $P_L = a \cdot P_H$ (a is a constant) measured. The "initialized" medium (D) is set in the apparatus of Embodiment 1, and is rotated at 3,600 rpm. In this state, a laser beam is radiated at a position of the radius $r=30$ mm to record information. As the information to be recorded, the standard information $T_8$ having the largest pulse width is selected. At this time, sufficiently low $P_L$ is set, and recording is repeated while changing $P_H$ from 7.5 mW to 16 mW. Every time information is recorded, it is reproduced. After recording is confirmed, $P_L$ is increased, and the beam at the increased level $P_L$ is radiated in a DC-ON state (i.e., without being modulated), thereby erasing the recorded standard information. Reproduction is performed again to check if the standard information is completely erased. Thus, the lowest $P_{Lmin}$ necessary for completely erasing the information is obtained. $P_{Lmin}$ varies depending on $P_H$. For this reason, the positions of $P_H$ and $P_{Lmin}$ of respective recording operations were plotted on the X-Y coordinate system defined by plotting $P_L$ along the ordinate and plotting $P_H$ along the abscissa. As a result, a line of $a=0.5$ was obtained. In FIG. 20, a line of $P_L=0.5 \times P_H$, and a line of $P_{Hth}=7.5$ mW measured in the above-mentioned paragraph (3) were added, thereby obtaining a triangle connecting points A, B, and C.

(5) Recording (Measurement of Power Margin)

Figure 1A:
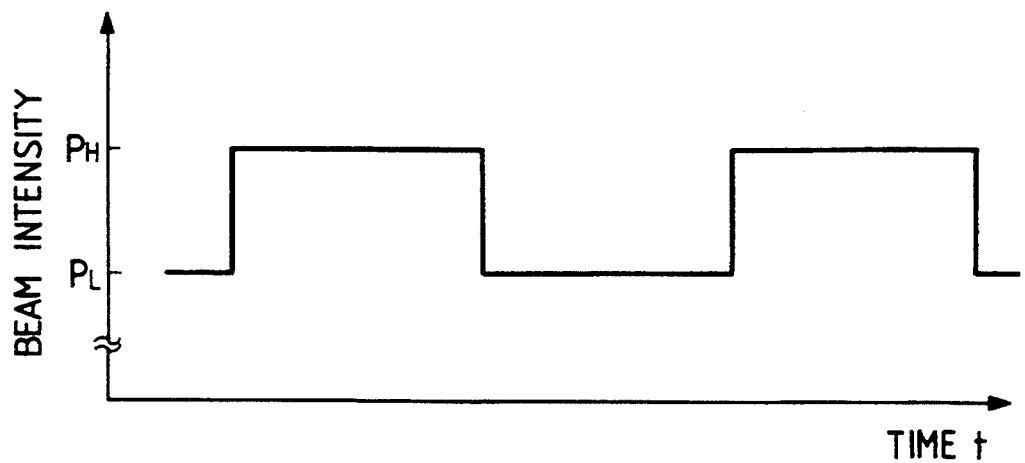
FIGS. 1A and 1B are waveform charts of standard information to be recorded in the prior art and Embodiment 2 of the present invention, respectively.
Figure 1B:
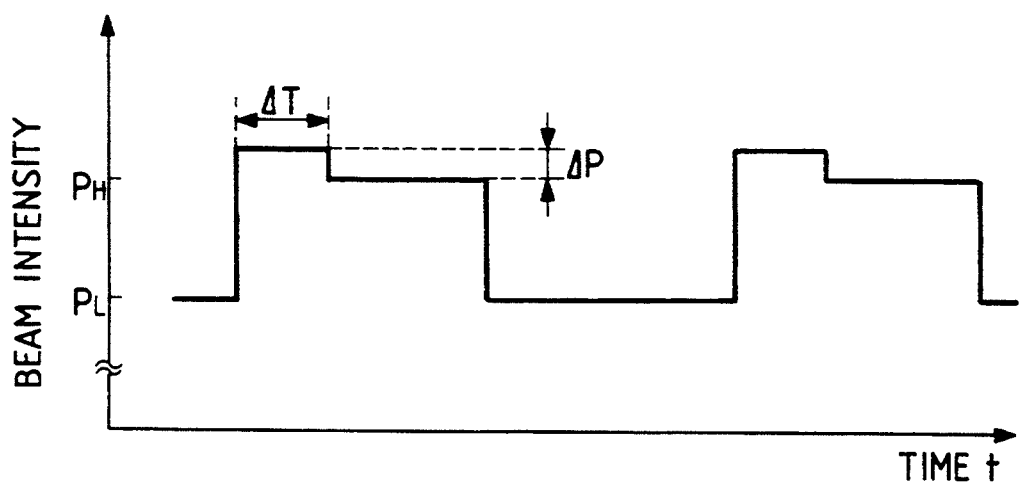
Figure 2:
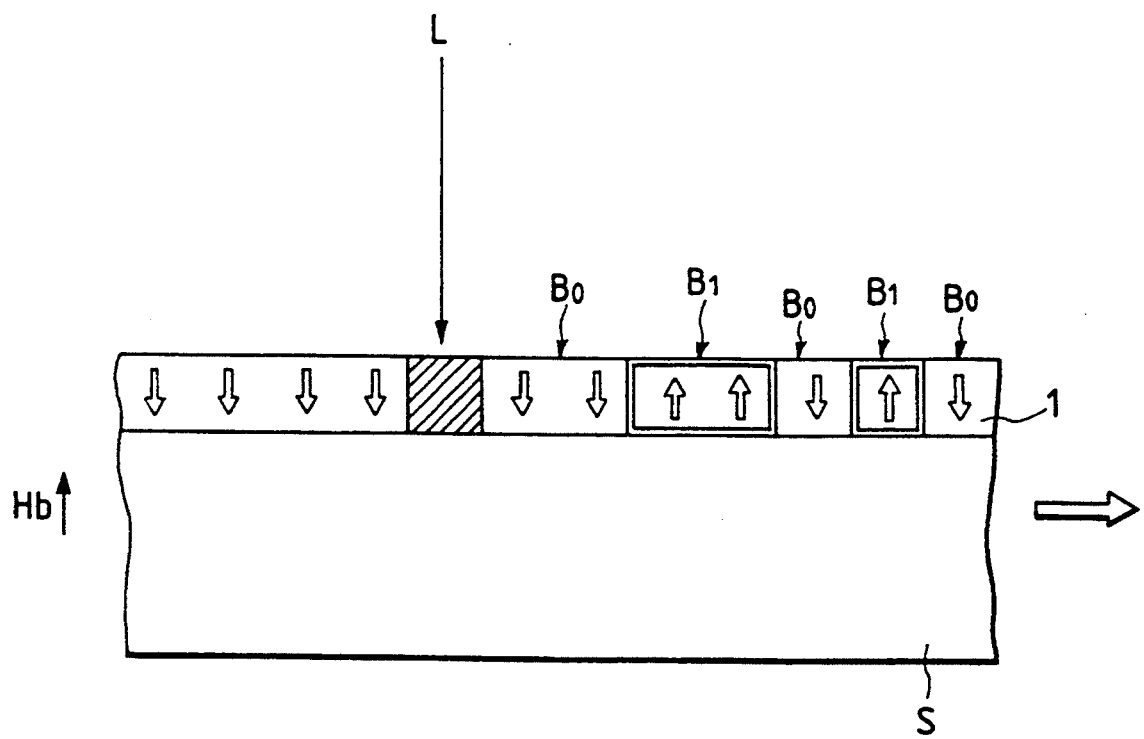
FIG. 2 is a schematic view for explaining the principle of recording of a magnetooptical recording method.
Figure 3:
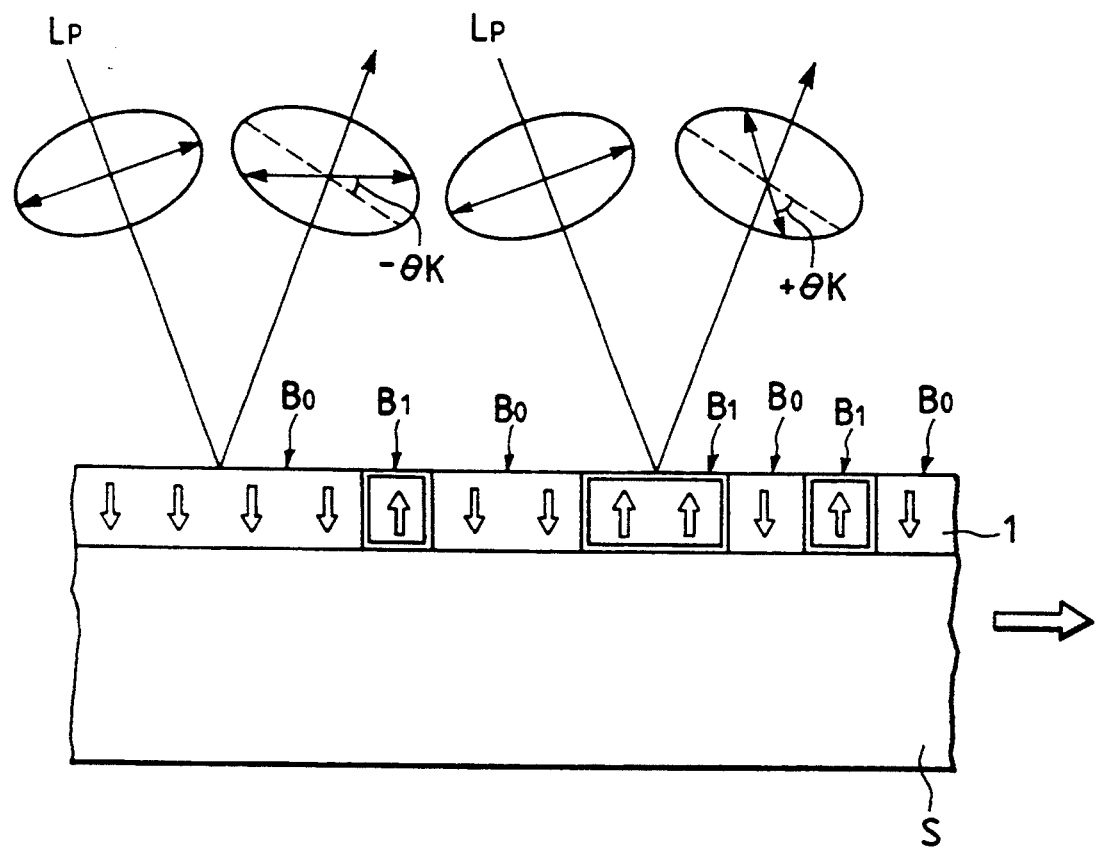
FIG. 3 is a schematic view for explaining the principle of reproduction of the magnetooptical recording method.
Figure 4:
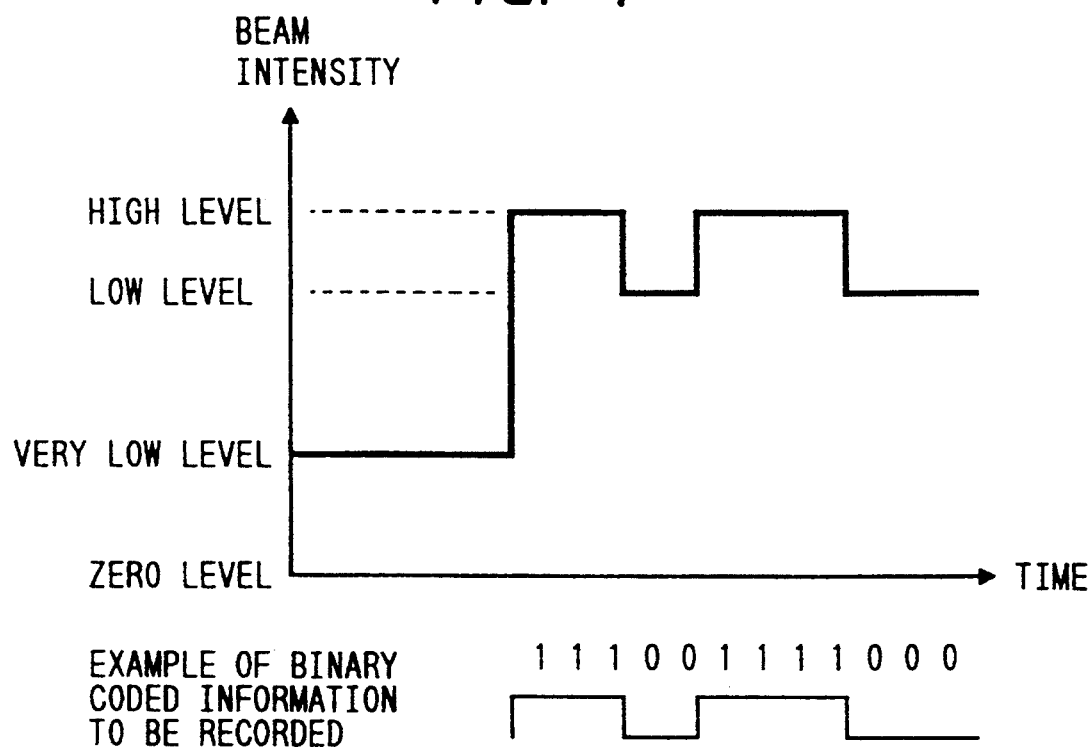
FIG. 4 is a waveform chart of a laser beam when an overwrite operation is performed according to the basic invention.
Figure 5:
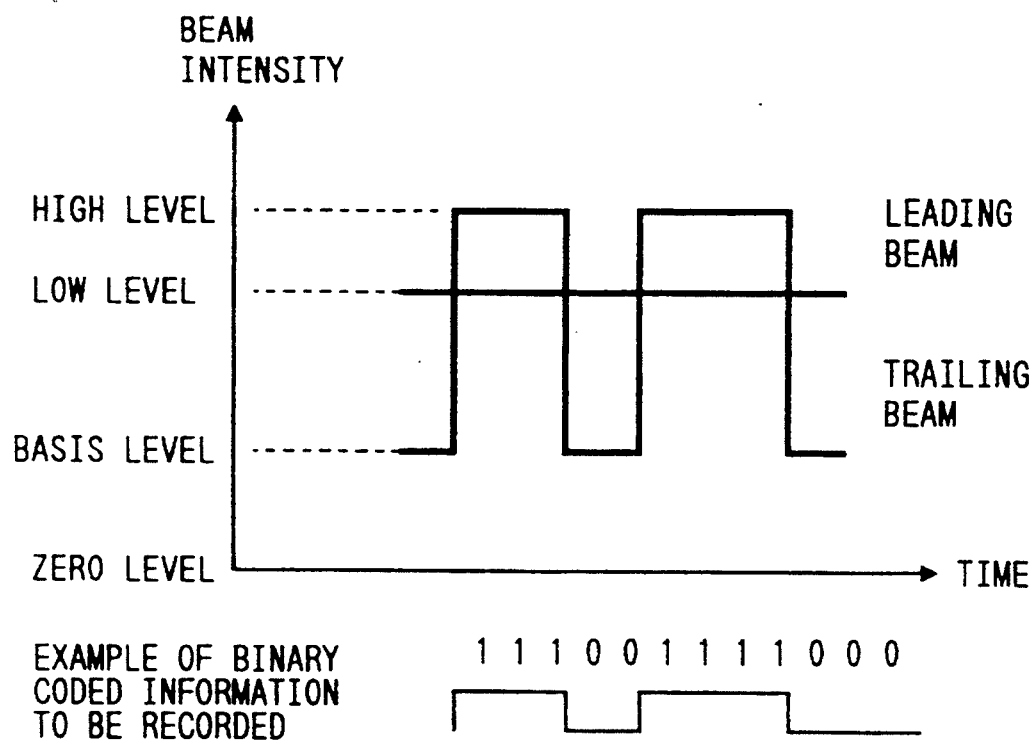
FIG. 5 is a weveform chart of a laser beam when an overwrite operation is performed using two beams according to the basic invention.
Figure 9A:
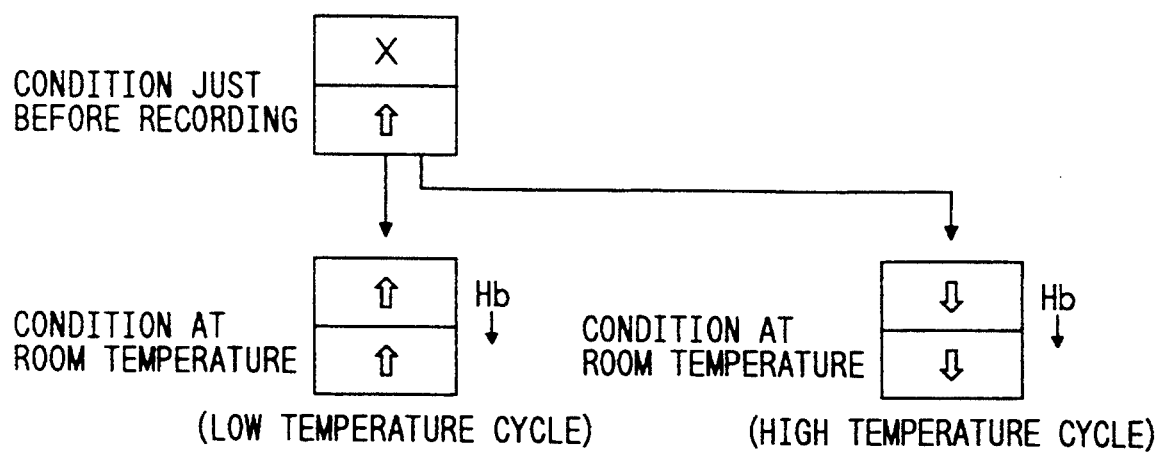
FIGS. 9A and 9B are respectively diagrams showing changes in direction of magnetization of the first and second layers of P and A type media after the low- and high-temperature cycles, and show conditions at a room temperature.
Figure 9B:
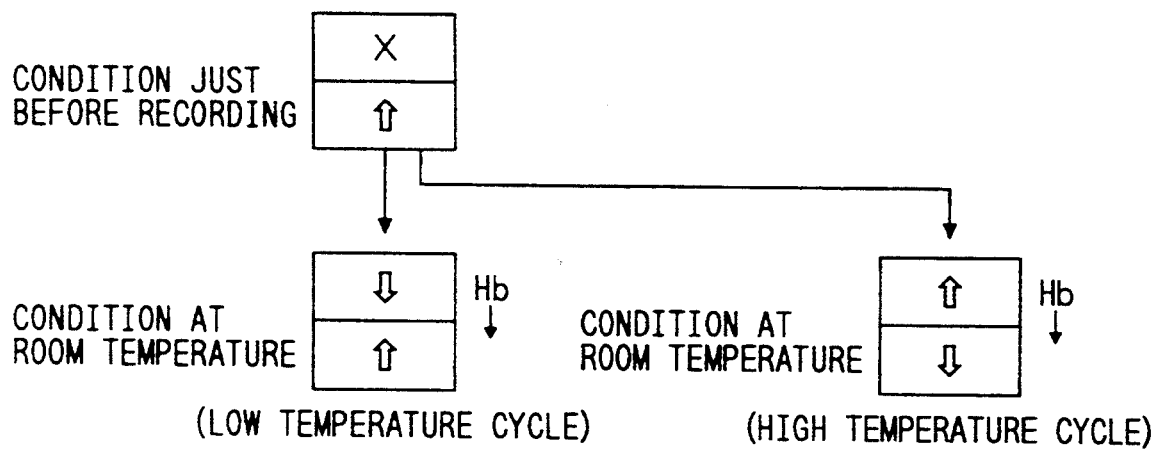
Figure 11:
FIG. 11 is an explanatory view for comparing a vector (solid arrow) representing a sublattice magnetization of a rare-earth (RE) atom, and a vector (dotted arrow) representing a sublattice magnetization of a transition-metal (TM) atom.
Figure 12:
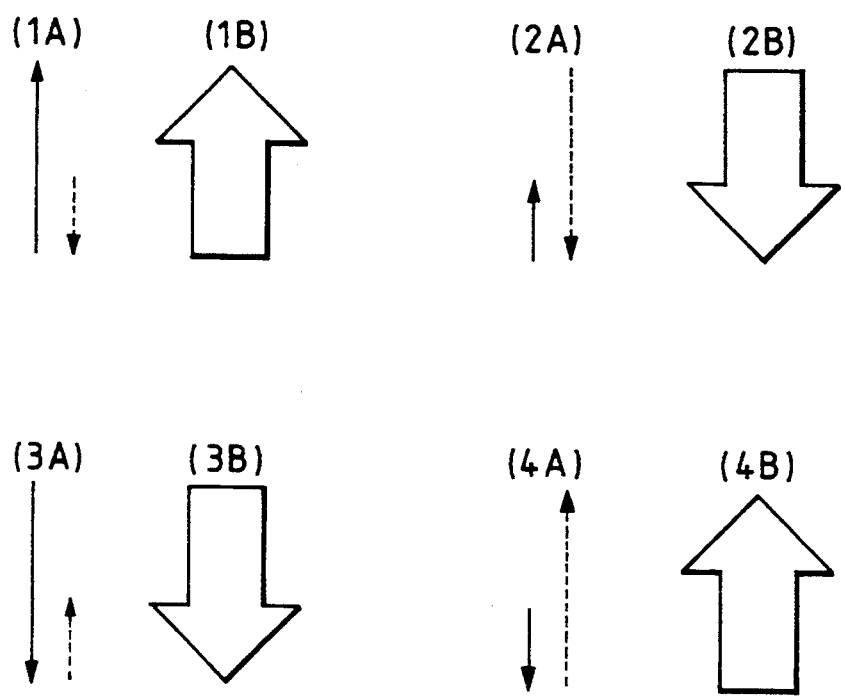
FIGS. 12(1A) to (4B) are explanatory views showing the relationship between the sublattice magnetization vectors ↑ and ↓ and a hollow arrow indicating the direction of magnetization of an alloy.
Figure 13:
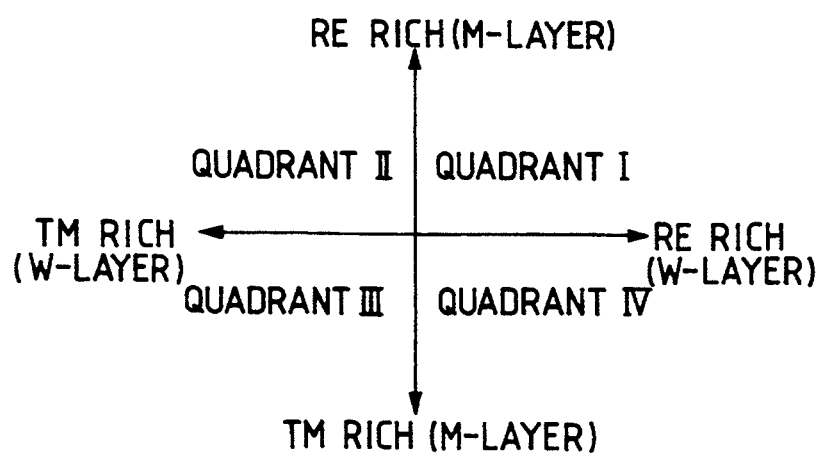
FIG. 13 is a map showing types of media classified into four quadrants.
Figure 14:
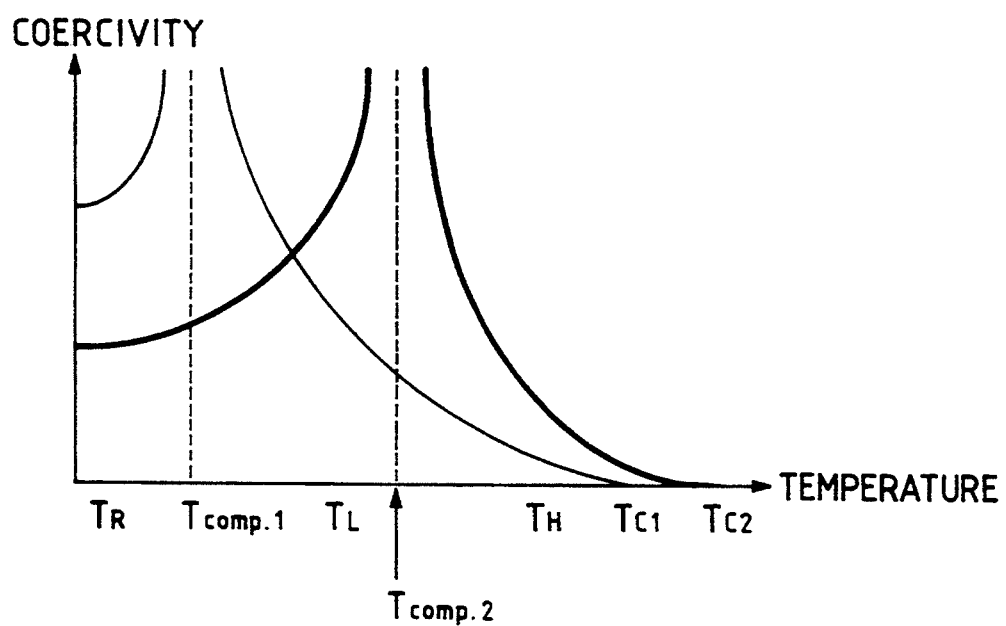
FIG. 14 is a graph showing the relationship between the coercivities and the temperatures of M and W layers of an over-write capable magnetooptical recording medium No. 1-1.
Figure 15:
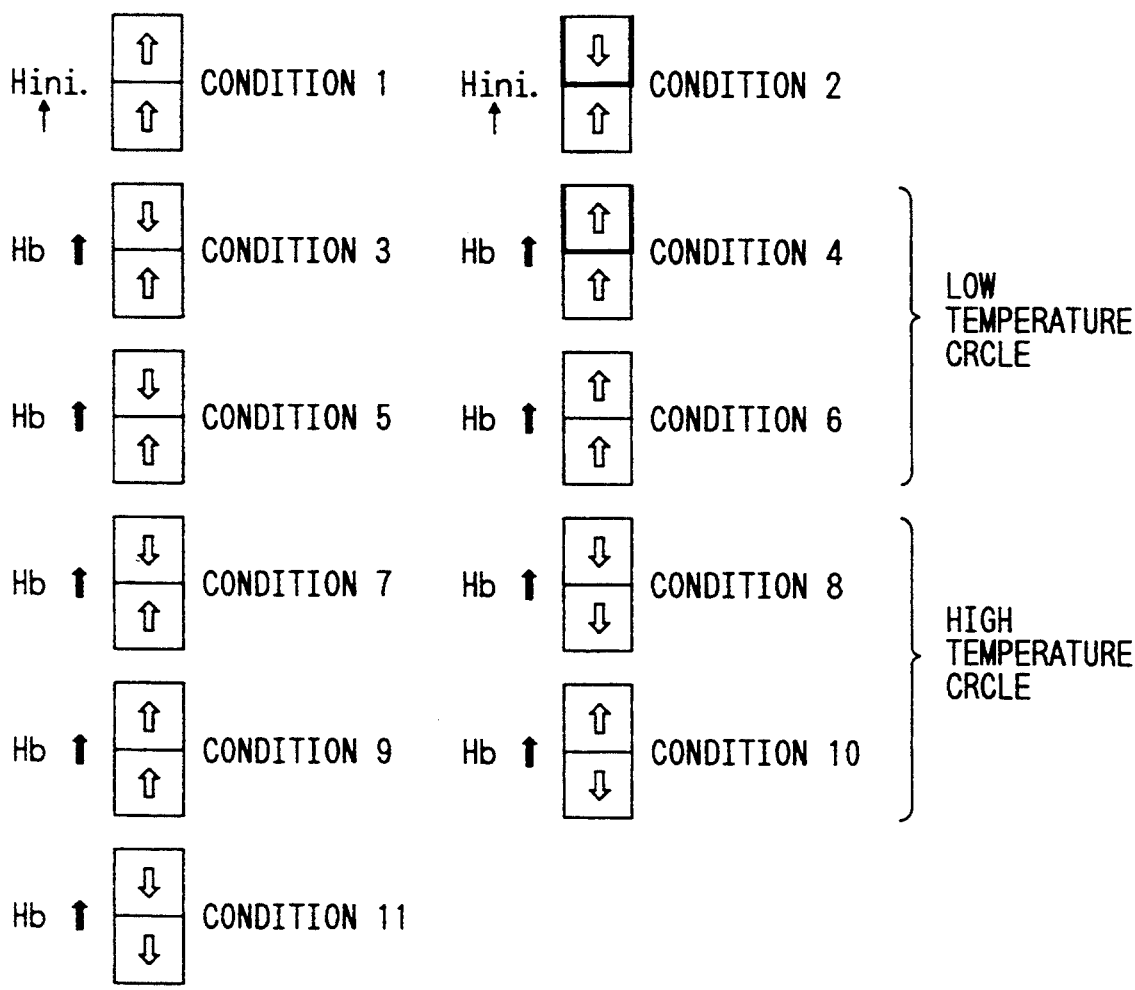
FIG. 15 is a chart showing changes in directions of magnetization of the M and W layers as a result of low- and high-temperature cycles of the medium No. 1-1.
Figure 16:
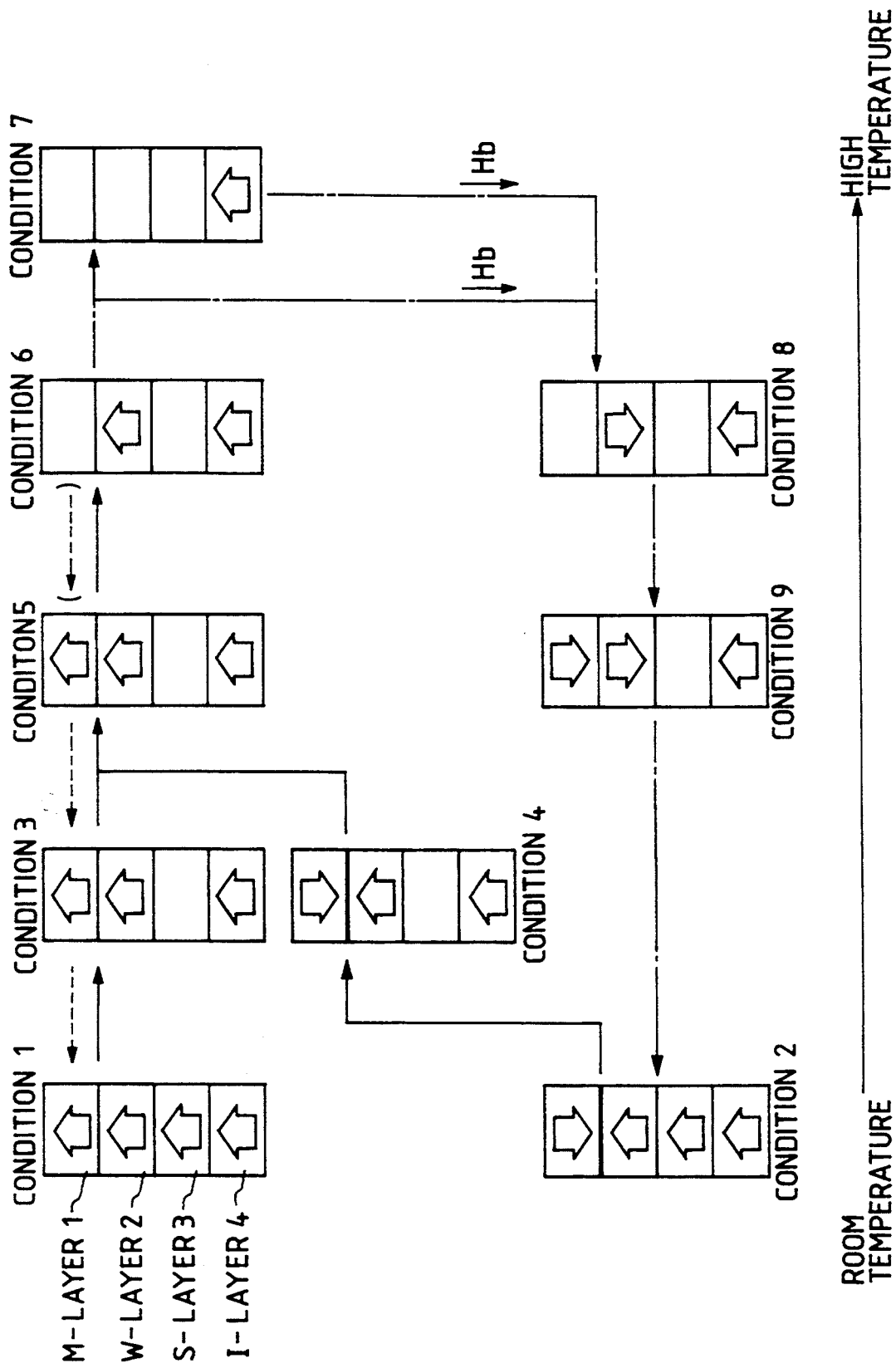
FIG. 16 is a chart for explaining the over-write principle of a four-layered structure over-write capable magnetooptical recording medium according to the selection invention.
Figure 17:
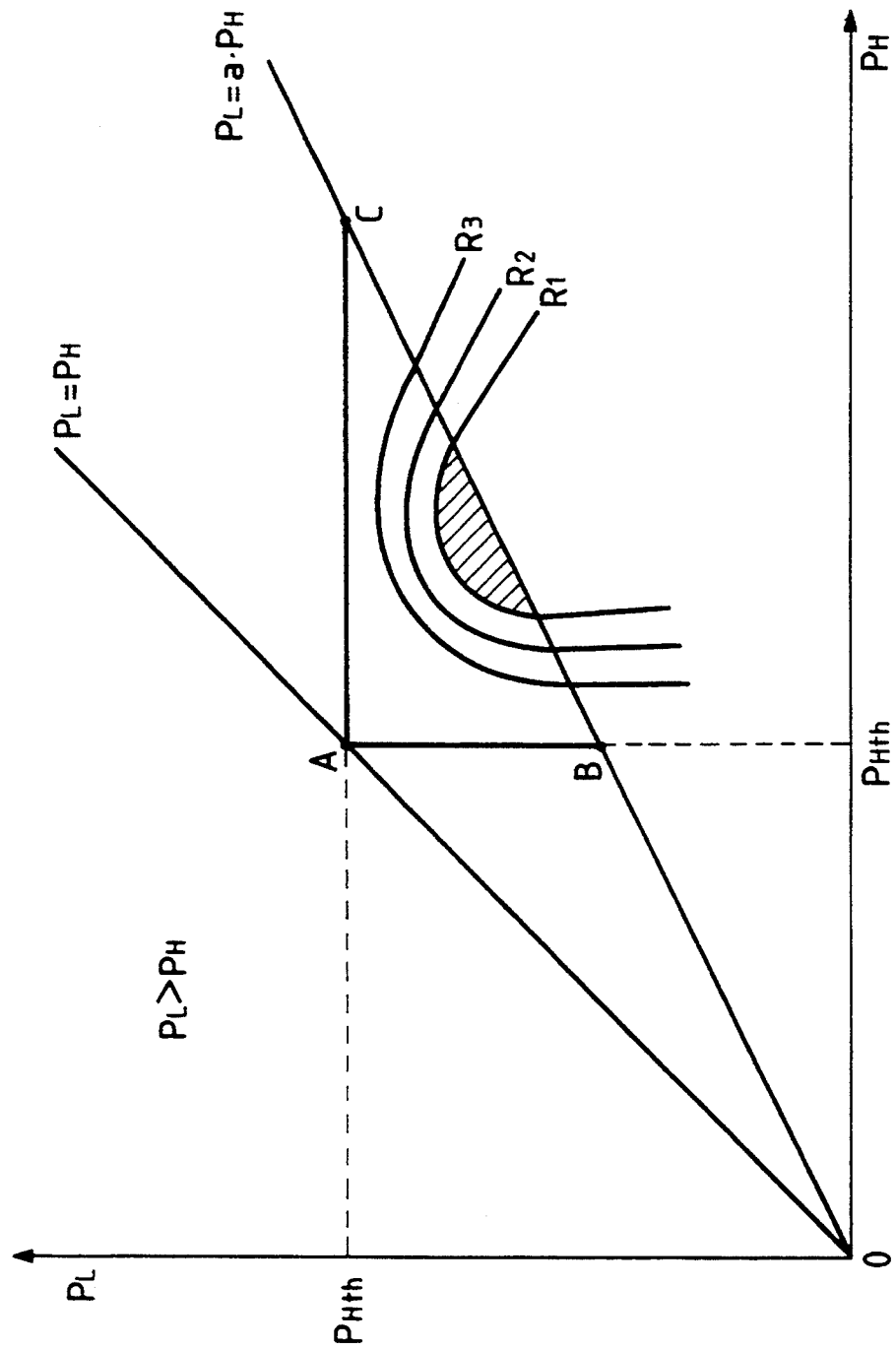
FIG. 17 is an explanatory view for explaining a power margin.

The waveform of one pulse of the standard information ($T_4$ to $T_8$) is shaped according to the present invention. FIG. 1A shows the waveform of the standard information before shaping. FIG. 1B shows the waveform of the standard information after shaping. $P_H$ is increased by $\Delta P=3$ mW at the beginning of recording, and is returned to the original level after an elapse of $\Delta T = 3 \times 24$ nsec (corresponding to the PDT of $T_3$). In other words, $P_H$ is lowered by $\Delta P=3$ mW after the elapse of $\Delta T = 3 \times 24$ nsec from the beginning of recording.

The waveform of the information is shaped, as described above, and $P_L$ and $P_H$ are arbitrarily selected in the triangle connecting the points A, B, and C shown in FIG. 20. The standard information $T_3$ is recorded and reproduced using the selected $P_L$ and $P_H$, and the C/N ratio is measured. The obtained C/N ratio is plotted on the same coordinate system as that in FIG. 20. This operation is repeated for other standard information ($T_4$ to $T_8$).

Assume that a predetermined C/N ratio is determined to be 46 dB, and only points of $P_L$ and $P_H$ from which the C/N ratio of 46 dB or more is obtained are selected from the coordinate system. A line is drawn to surround only the selected points. A region within the obtained line represents the power margin. As a result, as for any standard information ($T_3$ to $T_8$), a substantially semi-circular power margin (embodiment) indicated by cross-hatching in FIG. 20 was obtained as a power margin from which the C/N ratio of 46 dB or more was obtained.

In contrast to this, when information was similarly recorded and reproduced without shaping the pulse waveform, a semi-circular power margin (prior art) indicated by hatching in FIG. 20 was obtained. As can be seen from FIG. 20, the power margin of the recording method of this embodiment can be widened several times that of the prior art.

(6) Others

Waveform shaping according to the present invention is not limited to the above embodiment. For example, the waveform may be shaped, as shown in FIGS. 21A to 24.

Ease of Discrimination of Data

Figure 27A:
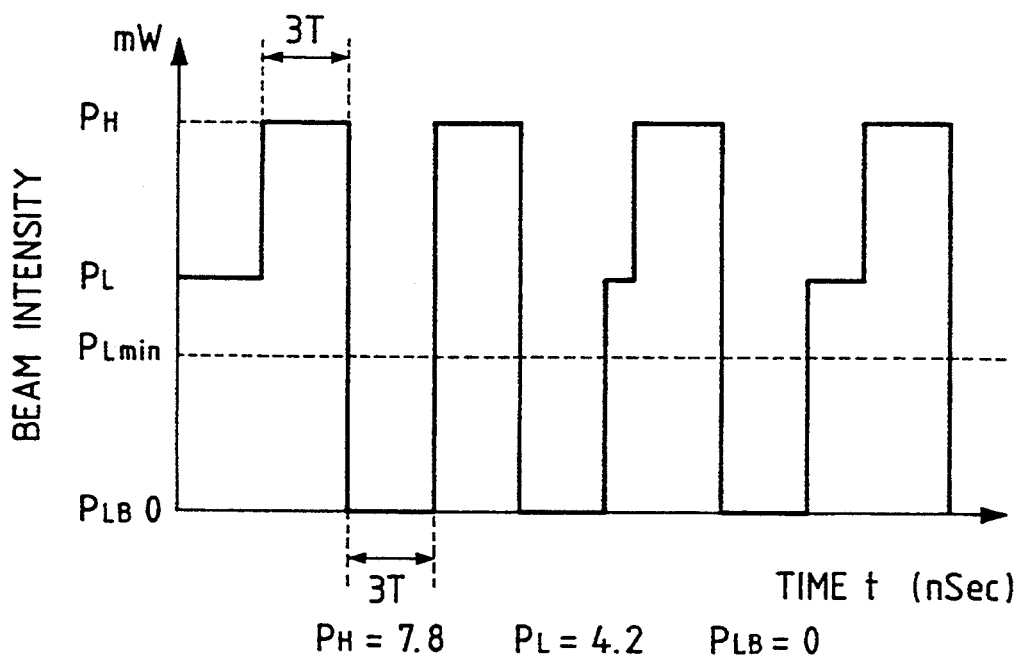
FIGS. 27A and 27B are respectively a waveform chart of information to be recorded, and an oscillogram showing a reproduced signal according to the conventional method.
Figure 27B:
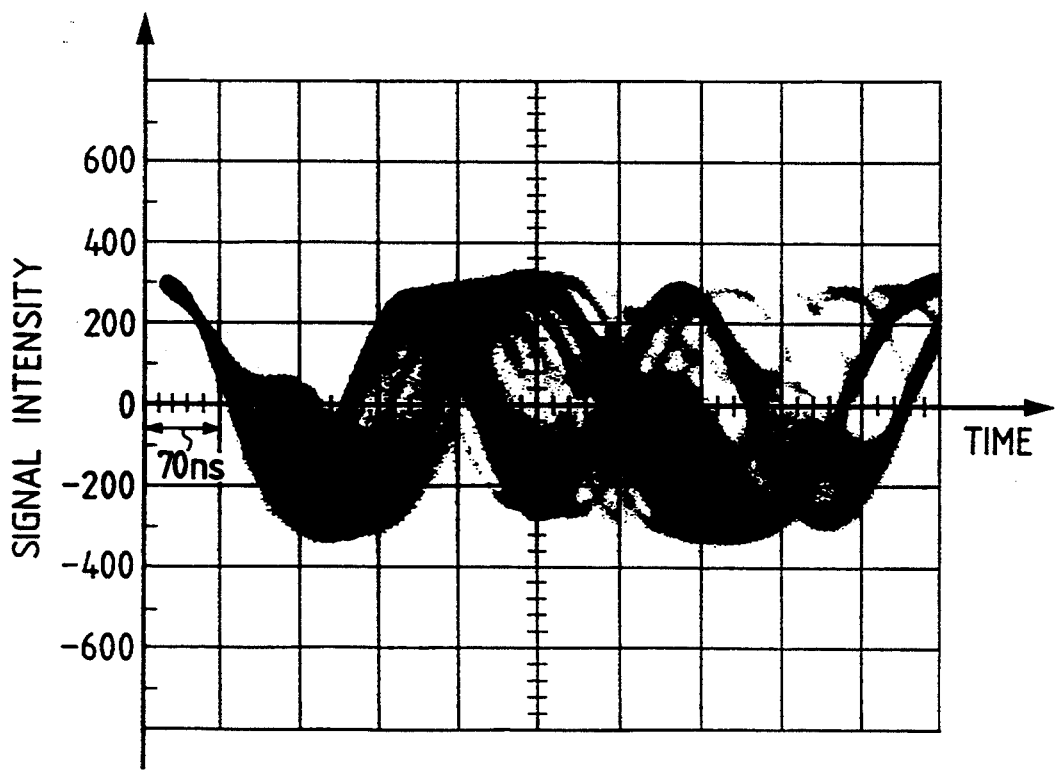
Figure 28A:
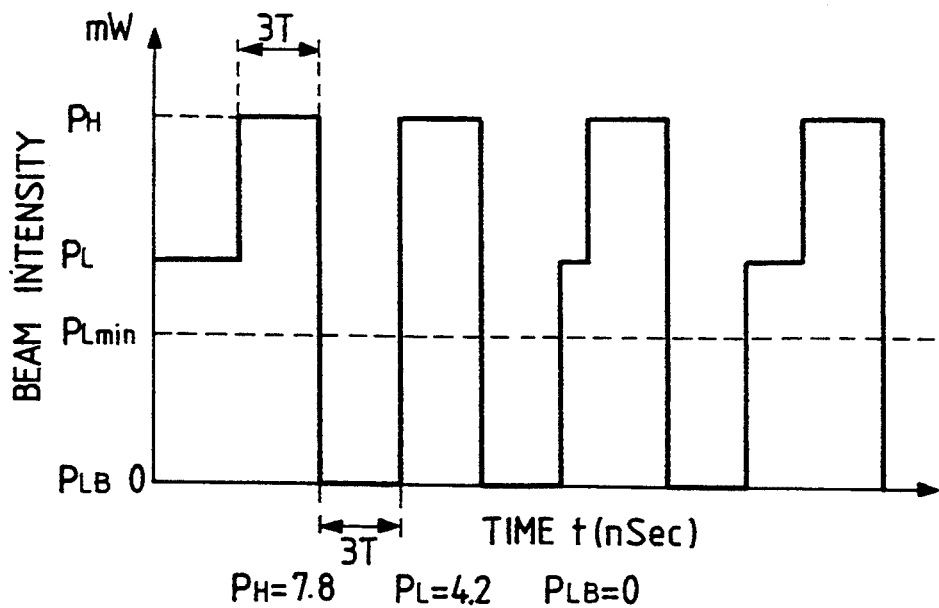
FIGS. 28A and 28B are respectively a waveform chart of information to be recorded, and a graph showing data discrimination data according to the conventional method.
Figure 28B:
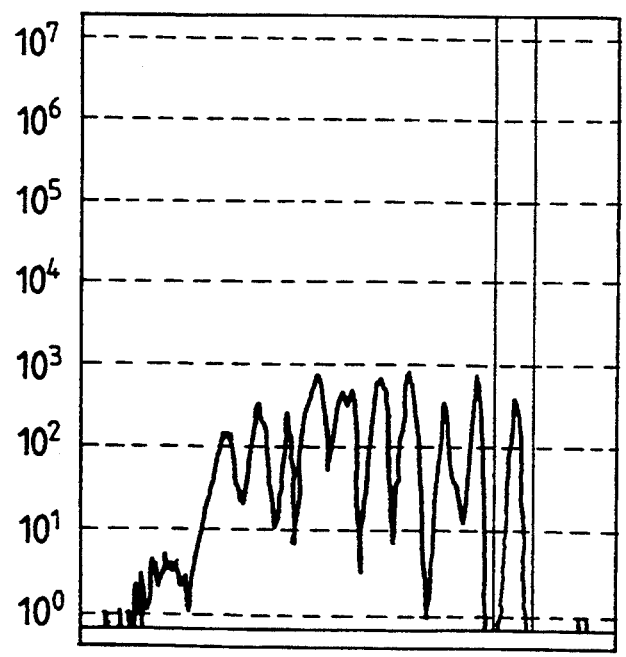
Figure 29A:
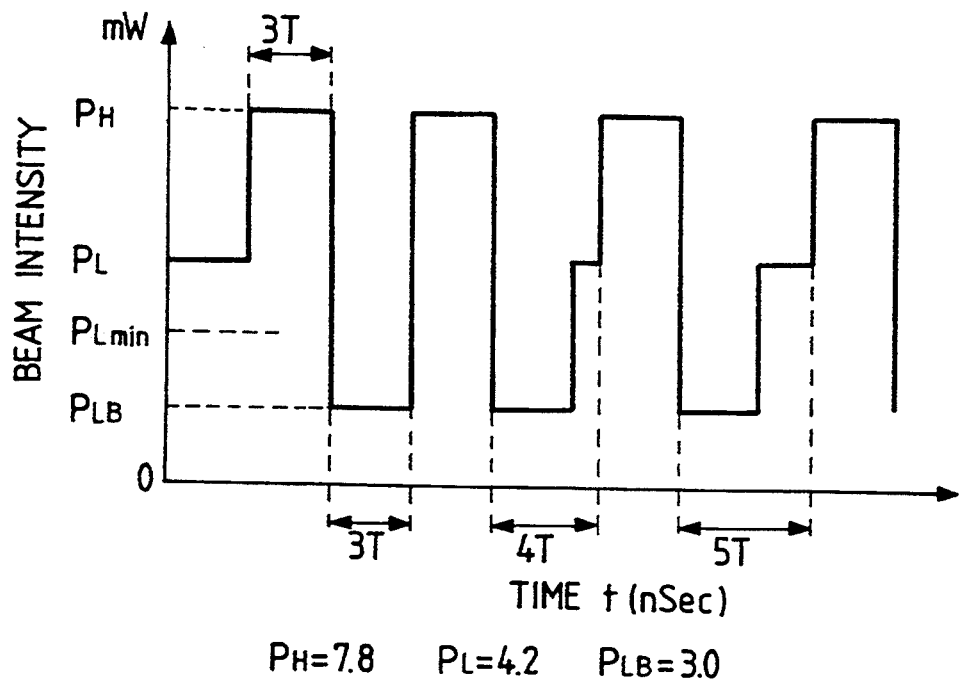
FIGS. 29A and 29B are respectively a waveform chart of another information to be recorded, and a graph showing data discrimination data according to the conventional method.
Figure 29B:
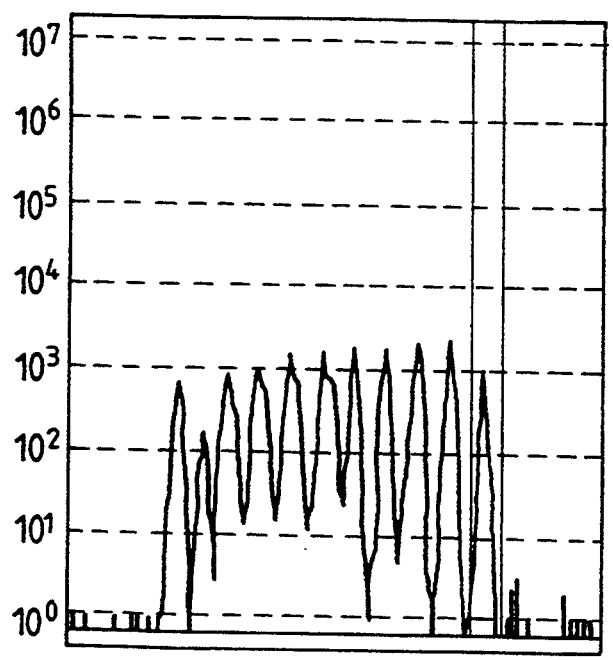

When the decrease amount of $P_L$ when $P_L$ is decreased below the limit value $P_{Lmin}$ is increased, and the duration of the decreased $P_L$ is prolonged, the ease of discrimination of data is deteriorated. FIG. 27B shows the waveform of a reproduced signal when $P_{LB}=0$ below $P_{Lmin}$ is set, as shown in FIG. 27A. As can be seen from FIG. 27B, a vague waveform representing that a pre-recorded mark is not completely erased appears as the waveform of the reproduced signal. In FIGS. 28A and 28B, and FIGS. 29A and 29B, the edge interval is measured in the cases of $P_{LB}=0$ (FIG. 28A) and $P_{LB}=3.0$ (FIG. 29A), and the measured data is shown in the form of a frequency table. The appearance frequency of edge intervals is expressed as eleven peaks having nTu (n= 6 to 16) as the center. As the adjacent peaks are separated from each other, it can be determined that variations of the edge intervals are small, and the ease of discrimination of data is high (good). As can be seen from a comparison between FIGS. 28B and 29B, when $P_{LB}$ is further decreased, peak separation becomes indistinct, and the ease of discrimination of data is deteriorated.

Embodiment 3: Magnetooptical Recording Apparatus

The principal arrangement of this apparatus is substantially the same as that in FIG. 18. This apparatus also serves as a reproduction apparatus, and mainly comprises a motor (rotating means 6) for rotating a magnetooptical recording medium (D), a laser beam light source (2), a light source drive circuit (1) for pulse-modulating the laser beam intensity between a high level $P_H$ and a low level $P_L$ according to binary coded information to be recorded, a bias field applying means (a permanent magnet 11 having Hb=300 Oe on the magnetic film of the medium), a pulse waveform shaping circuit (10), and an initial field applying means (a permanent magnet 12 having Hini.=3 kOe on the magnetic film of the medium). The direction of Hb is the same as that of Hini. The shaping circuit 10 shapes a pulse waveform, as shown in FIG. 30A. That is, when the beam intensity is increased from the low level $P_L$ to the high level $P_H$, it is temporarily decreased below the limit value $P_{Lmin}$, and is then based on the high level $P_H$ is started, the laser beam intensity is decreased, and $P_{HB}$ mark formation is continued. Thereafter, upon completion of mark formation, the laser beam intensity is decreased to the low level $P_L$ again.

The medium rotated by the rotating means (6) is "initialized" by passing above the magnet (12). An "initialized" W layer portion then reaches the radiation position of the laser beam. When a medium having an I layer is used, the magnet (12) is not necessary.

Figure 31A:
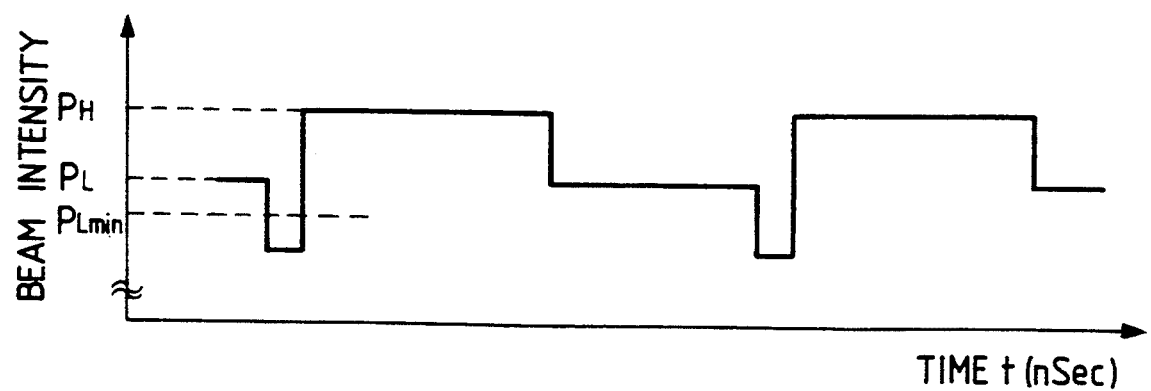
FIGS. 31A to 31C are waveform charts of comparative examples.
Figure 31B:
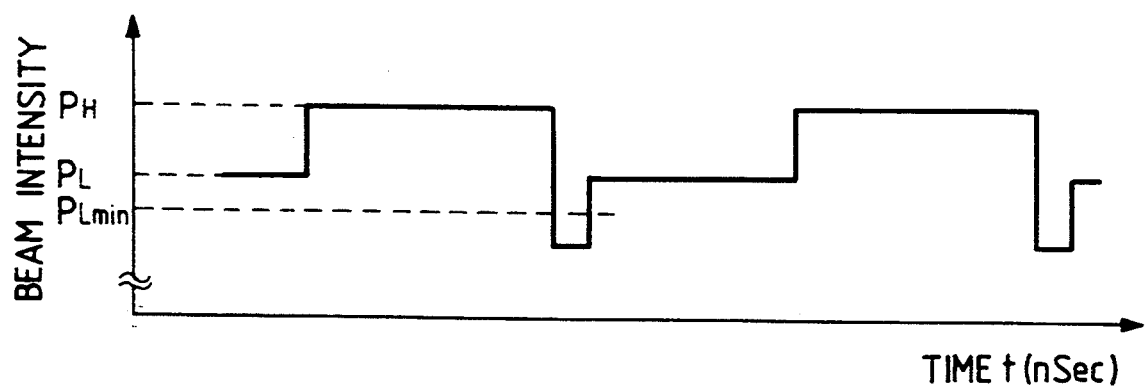
Figure 31C:
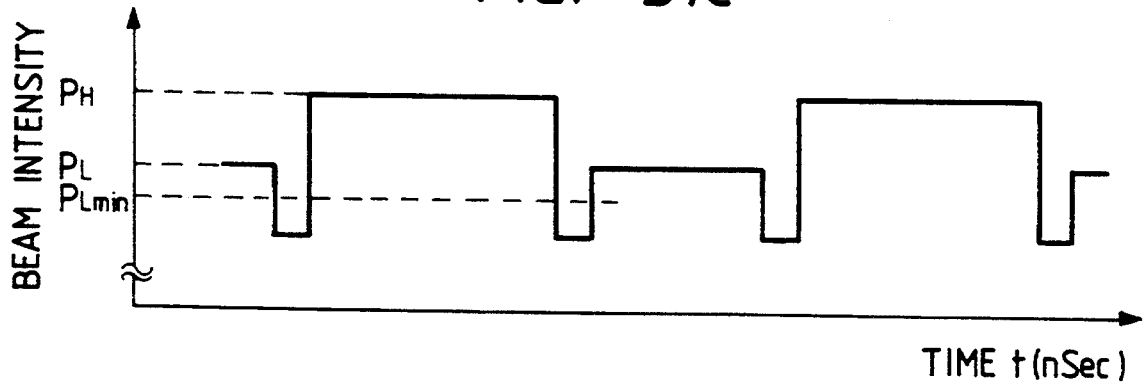

The laser beam emitted from the light source (2) is pulse-modulated by the light source drive circuit (1) in accordance with the binary coded information to be recorded. In the conventional waveform, as shown in FIGS. 31A to 31C, when a mark is formed at the high level $P_H$, the laser beam intensity is kept at a predetermined value until mark formation is completed. In contrast to this, the pulse waveform is shaped, as shown in FIG. 30A, according to the present invention.

The laser beam emitted from the light source (2) is collimated through a collimator lens (3), and is then reflected by a beam splitter (4). The reflected beam is focused by an objective lens (5), and forms a focal point on the medium (D). Thus, recording is basically ended. In a reproduction mode, a non-modulated (DC-ON) laser beam having a lowered intensity is radiated on the medium (D) in the same manner as in a recording mode. Light reflected by the medium is incident on the beam splitter (4) through the objective lens (5), and light transmitted through the beam splitter (4) is focused by a focusing lens (7). Thereafter, the light is incident on a detector (9). At this time, the rotation condition ($+\theta k$ and $-\theta k$) of the plane of polarization is converted into a change in light intensity through an analyzer (polarizer) arranged between the focusing lens (7) and the detector (9). Thus, recorded information of the medium (D), which is read as rotation of the plane of polarization is converted into a change in light intensity. The change in light intensity is converted into an electrical signal level by the detector (9). This is the reproduction operation.

Embodiment 4: Magnetooptical Recording Apparatus

This apparatus is substantially the same as that of Embodiment 3, except for the shaping circuit. In this embodiment, the shaping circuit (10) shapes a pulse waveform, as shown in FIG. 30B. That is, when mark formation based on the high level $P_H$ is started, the beam intensity is decreased, and $P_{HB}$ mark formation is continued. Thereafter, upon completion of mark formation, the laser beam intensity is temporarily decreased below the limit value $P_{Lmin}$, and is then returned to the low level $P_L$.

Embodiment 5: Magnetooptical Recording Apparatus

This apparatus is substantially the same as that of Embodiment 3, except for the shaping circuit. In this embodiment, the shaping circuit (10) shapes a pulse waveform, as shown in FIG. 30C. That is, ① when the beam intensity is increased from the low level $P_L$ to the high level $P_H$, the beam intensity is temporarily decreased below the limit value $P_{Lmin}$, and is then is increased to the high level $P_H$, thus starting mark formation. ② After the mark formation is started, the laser beam intensity is decreased, and $P_{HB}$ mark formation is continued. ③ Thereafter, upon completion of mark formation, the laser beam intensity is temporarily decreased below the limit value $P_{Lmin}$, and is then returned to the low level $P_L$.

Embodiment 6: Magnetooptical Recording (1) Preparation of Medium (Class 1)

A substrate obtained by forming a 0.03-mm thick 2P resin layer on a 1.2-mm thick glass disk having a diameter of 130 mm is prepared. A large number of tracking grooves are concentrically formed within a region of a radius r=30 to 60 mm on the 2P resin layer. Each groove has a depth h=700 Å, a groove width W=0.5 μm, and a pitch=1.6 μm. The following six layers are formed on the 2P resin layer by sputtering: ① a 700-Å thick silicon nitride layer as a protection layer; ② a 250-Å thick $Tb_{23}Fe_{72}Co_2$ layer (note that suffices are in units of atomic %; the same applies to the following description) as an M layer; ③ a 100-Å thick $Gd_{23}Fe_{72}Co_5$ layer as an exchange coupling force adjustment layer; ④ a 500-Å thick $Dy_{28}Fe_{36}Co_{36}$ layer as a W layer; ⑤ a 100-Å thick silicon nitride thin film as a protection layer; and ⑥ a 700-Å thick silicon nitride thin film as a protection layer. Finally, a protection substrate is adhered on the protection layer ⑥, thus finishing the medium. The protection substrate is formed of the same material as the glass disk used in the substrate.

When an A-directed magnetic field of 23 kOe is applied to this medium, the directions of magnetization of both the M and W layers are aligned in the A direction ("initialized").

(2) Information to be Recorded

Information to be recorded is standard information. The standard information is information whose values H and L are switched at time intervals three to eight times a unit time Tu (23.9 nsec). If n is an integer, continuation of the value H (radiation of a laser beam at the high level $P_H$) during n·Tu is expressed as nL, and the standard information is set as follows:

```
3H3L3H4L3H5L3H6L3H7L3H8L
4H3L4H4L4H5L4H6L4H7L4H8L
5H3L5H4L5H5L5H6L5H7L5H8L
6H3L6H4L6H5L6H6L6H7L6H8L
7H3L7H4L7H5L7H6L7H7L7H8L
8H3L8H4L8H5L8H6L8H7L8H8L
3H3L6H8L
```

Note that 3H3L6H8L at the end of information is added for the sake of convenience so that the total of information becomes an integer multiple of 16T. The value H corresponds to a writing operation by radiating the high level laser beam.

(3) Measurement of $P_{Hth}$

The above-mentioned medium (D) is rotated at 3,600 rpm. In this state, a laser beam is radiated at a position of the radius r=30 mm to record information. As information to be recorded, the standard information $T_8$ having a sufficiently large pulse width is selected. At this time, sufficiently low $P_L$ is set, and recording is repeated while changing $P_H$. Every time information is recorded, it is reproduced. Thus, if even a very weak signal is reproduced in a reproduction mode, it is determined that a mark is formed by $P_H$, and the lowest value $P_H$ is determined as $P_{Hth}$. The medium (D) had $P_{Hth}$=6.0 mW.

(4) Measurement of $P_{Lmin}$

"a" in relation: $P_L = a \cdot P_H$ (a is a constant) is measured. The "initialized" medium (D) is rotated at 3,600 rpm. In this state, a laser beam is radiated at a position of the radius r=30 mm to record information. As the information to be recorded, the standard information $T_8$ having the largest pulse width is selected. At this time, sufficiently low $P_L$ is set, and recording is repeated while changing $P_H$ from 6.0 mW to 16 mW. Every time information is recorded, it is reproduced. After recording is confirmed, $P_L$ is increased, and the beam at the increased level $P_L$ is radiated in a DC-ON state (i.e., without being modulated), thereby erasing the recorded standard information. Reproduction is performed again to check if the standard information is completely erased. Thus, the lowest $P_{Lmin}$ necessary for completely erasing the information is obtained. $P_{Lmin}$ varies depending on $P_H$. For this reason, the positions of $P_H$ and $P_{Lmin}$ of respective recording operations were plotted on the X-Y coordinate system defined by plotting $P_L$ along the ordinate and plotting $P_H$ along the abscissa. As a result, as for the conventional method for forming a mark while the laser beam intensity upon radiation of the high level $P_H$, a line of a=0.5 was obtained, and as for the embodiment of the present invention, a line of a=0.4 was obtained.

(5) Recording

FIGS. 31A to 31C are waveform charts of standard information of comparative examples. FIGS. 30A to 30C show waveforms shaped by the shaping circuits according to Embodiments 3, 4, and 5, respectively. In this case, $P_H$ was set to be 7.8 mW, and $P_L$ was set to be 4.2 mW. $P_{HB}$ of the present invention was set to be 6.0 mW. At this time, from the above-mentioned relation, $P_{Lmin}$ was set to be 0.5 (=a)×$P_H$=3.9 mW in the prior art, and it was set to be 3.1 mW in this embodiment. Furthermore, $T_{LB}$=3Tu (71.7 nsec), $T_{LB}$=2Tu (47.8 nsec), and $P_{LB}$=0.5 mW.

(1) Comparative Example

The medium (D) is rotated at 3,600 rpm, and a laser beam is radiated at a position of a radius r=30 mm, thereby recording arbitrary information. Thereafter, standard information whose waveform is shaped, as shown in FIG. 31A, 31B, or 31C is over-written.

(2) Embodiment 6-1

The medium (D) is rotated at 3,600 rpm, and a laser beam is radiated at a position of a radius r=30 mm, thereby recording arbitrary information. Thereafter, the waveform of standard information is shaped (see FIG. 30A), and the information is over-written using the recording apparatus of Embodiment 3.

(3) Embodiment 6-2

The medium (D) is rotated at 3,600 rpm, and a laser beam is radiated at a position of a radius r=30 mm, thereby recording arbitrary information. Thereafter, the waveform of standard information is shaped (see FIG. 30B), and the information is over-written using the recording apparatus of Embodiment 4.

(4) Embodiment 6-3

The medium (D) is rotated at 3,600 rpm, and a laser beam is radiated at a position of a radius r=30 mm, thereby recording arbitrary information. Thereafter, the waveform of standard information is shaped (see FIG. 30C), and the information is over-written using the recording apparatus of Embodiment 5.

(5) Evaluation

Figure 32:
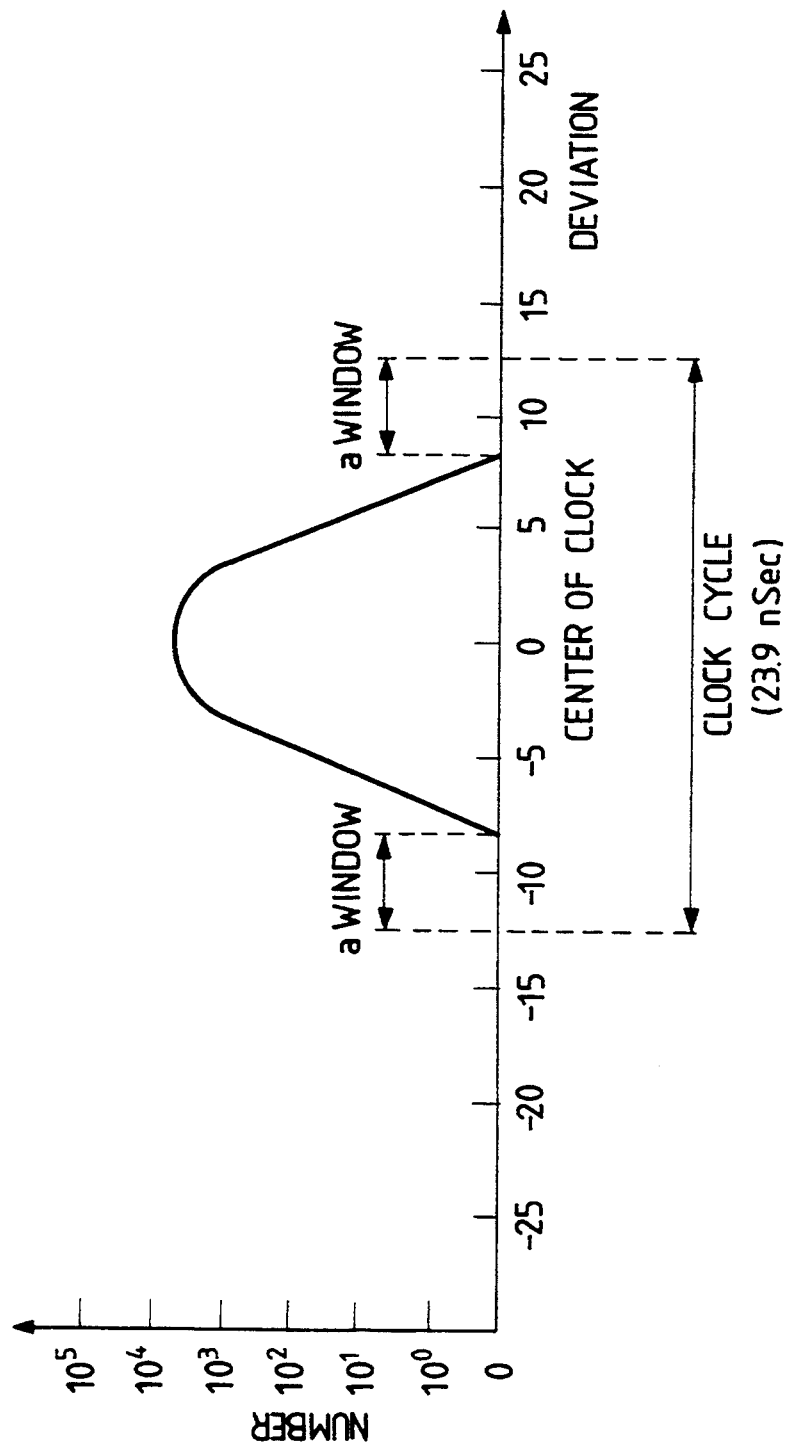
FIG. 32 is a histogram for measuring a window margin.
Figure 33A:
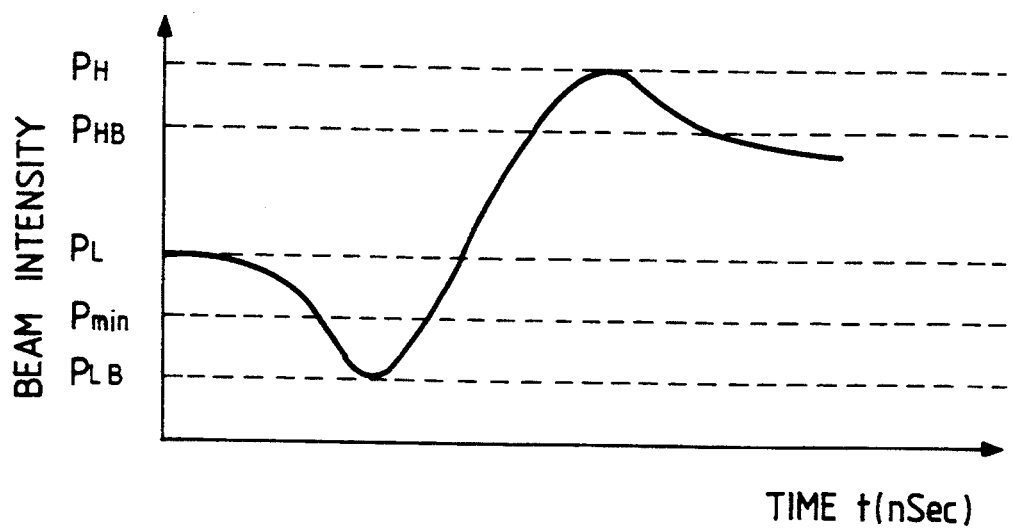
FIGS. 33A to 38B are partial waveform charts of standard information to be recorded according to other embodiments.
Figure 33B:
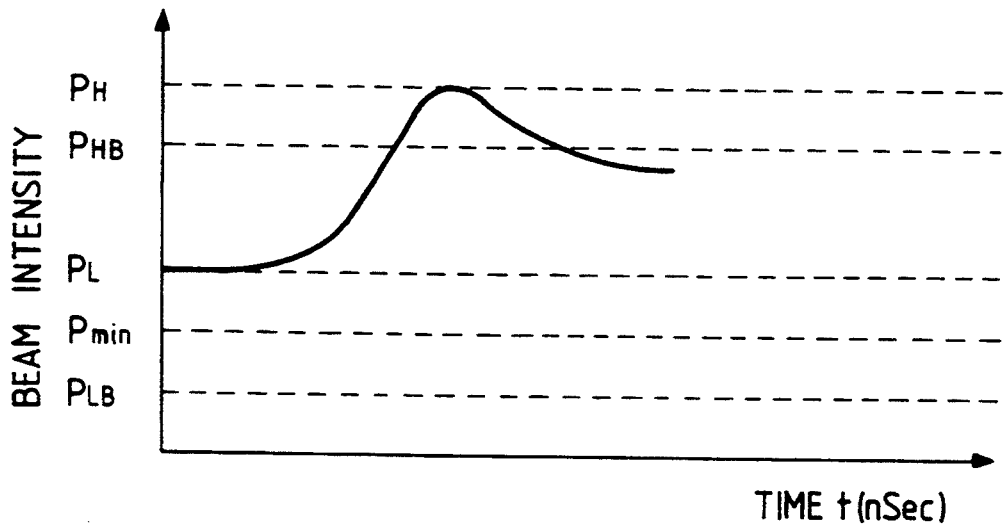
Figure 34A:
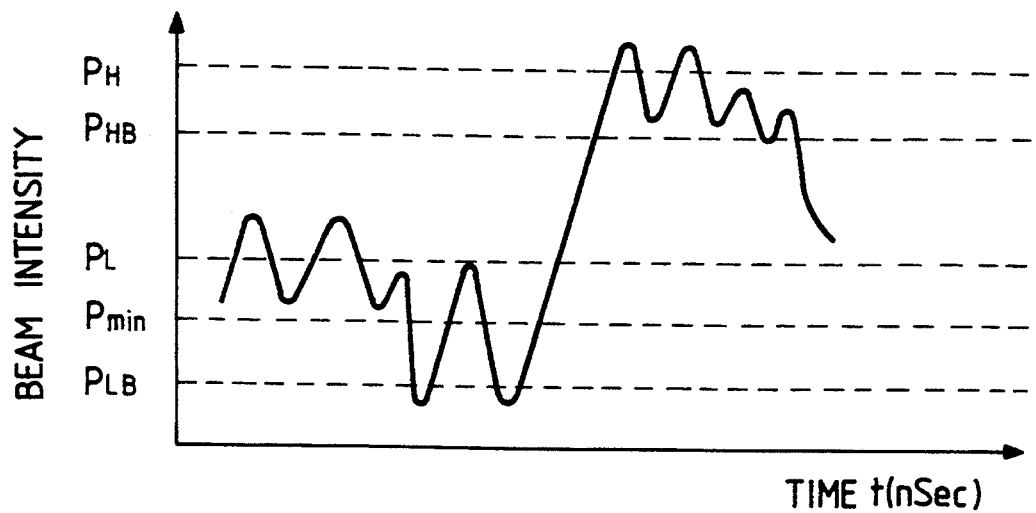
Figure 34B:
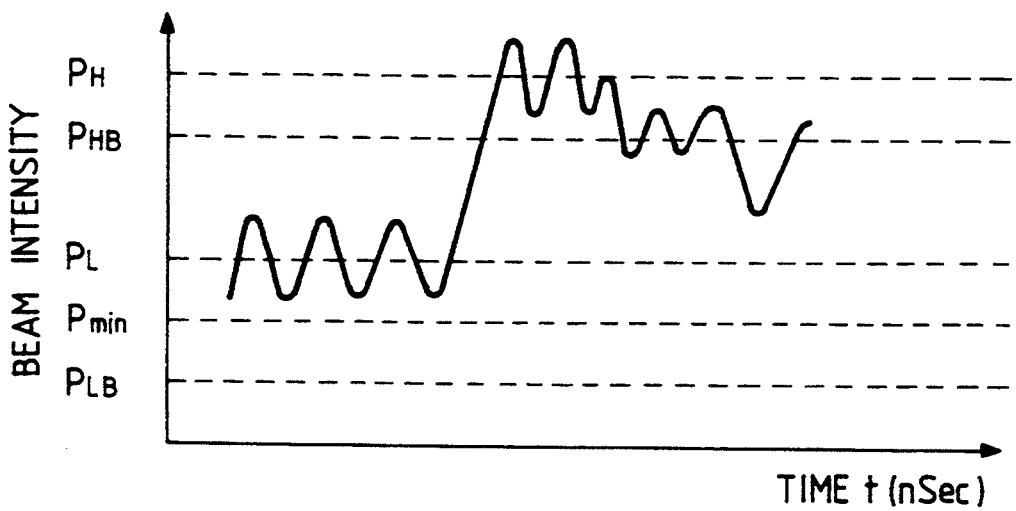
Figure 35A:
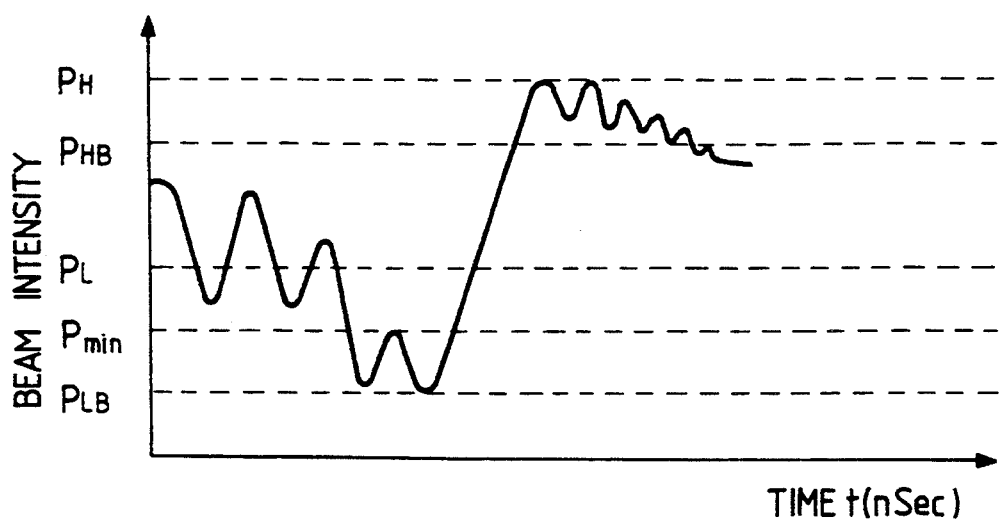
Figure 35B:
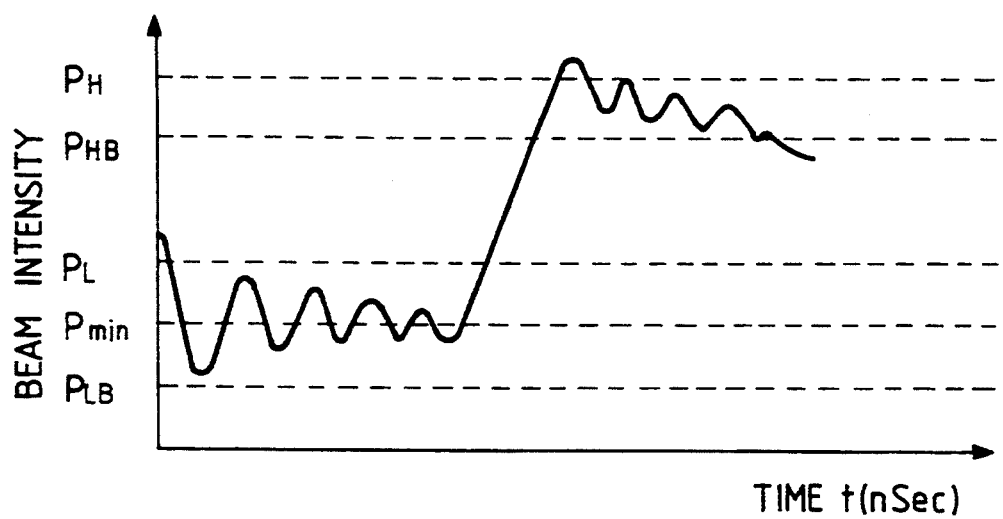
Figure 36A:
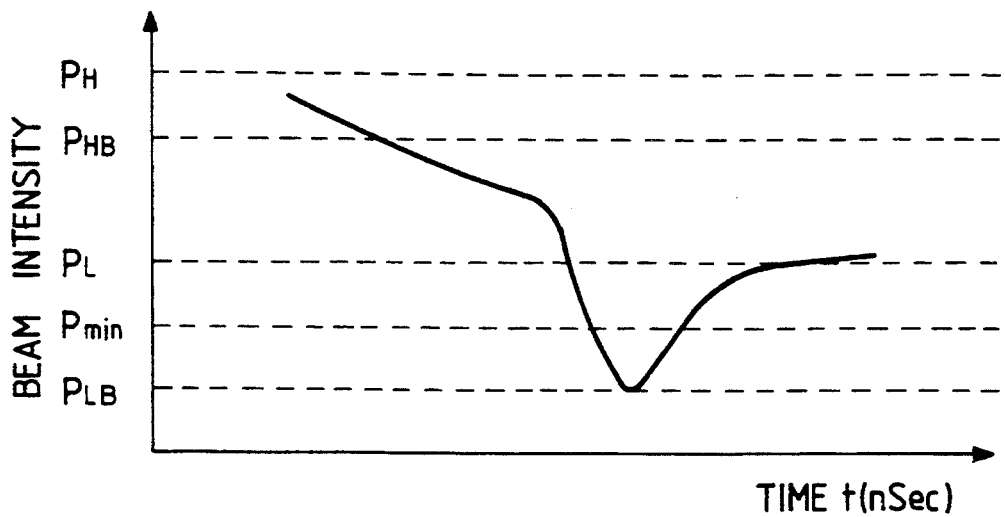
Figure 36B:
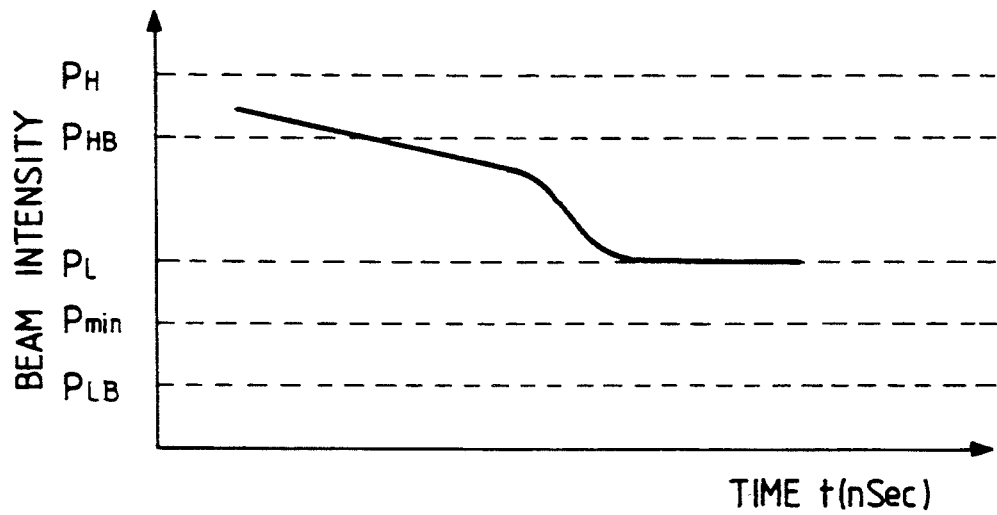
Figure 37A:
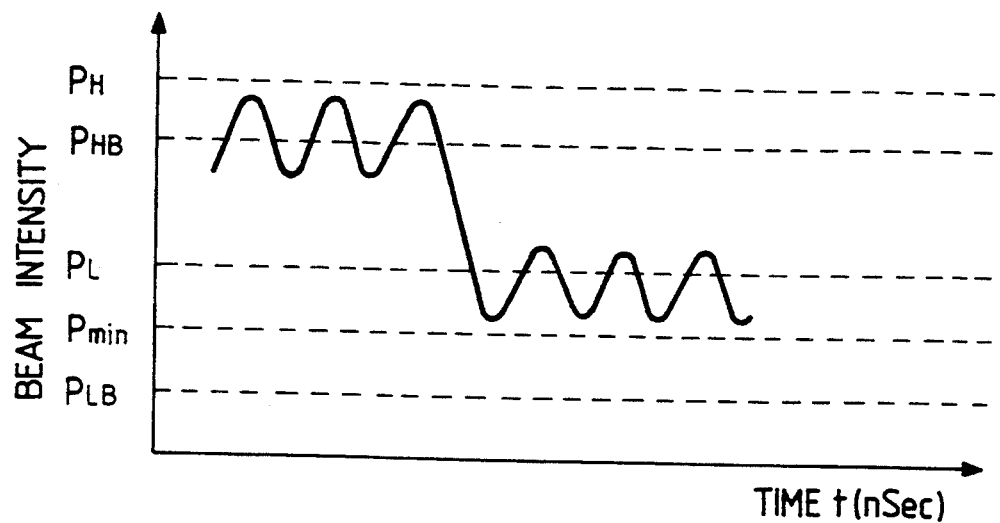
Figure 37B:
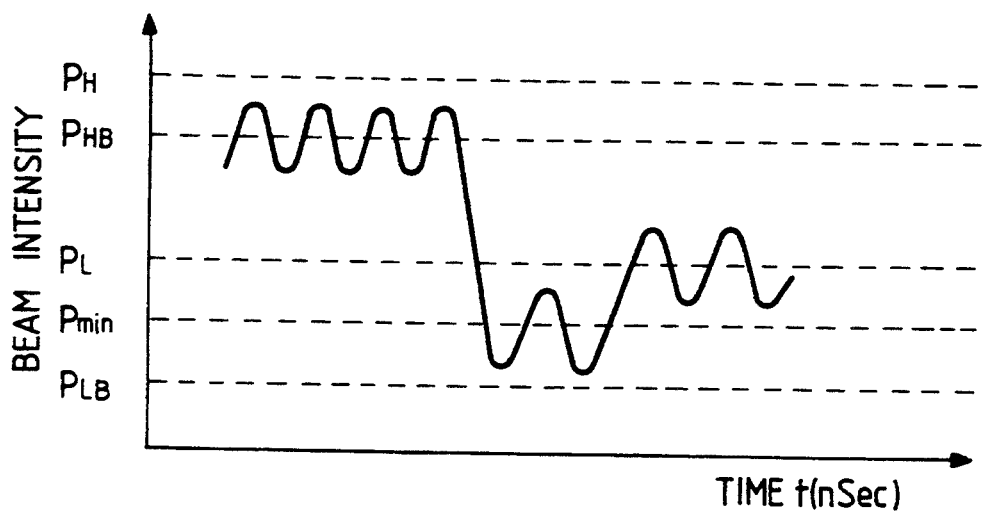
Figure 38A:
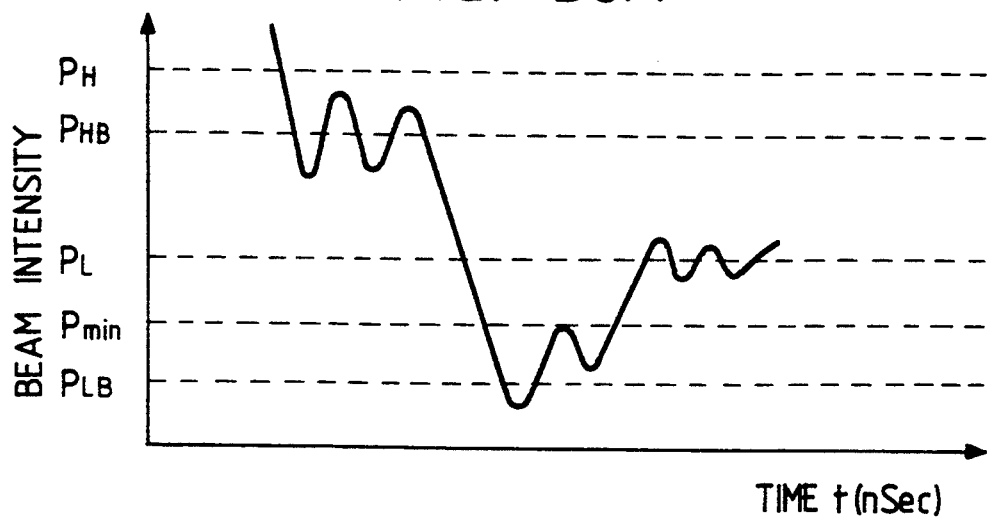
Figure 38B:
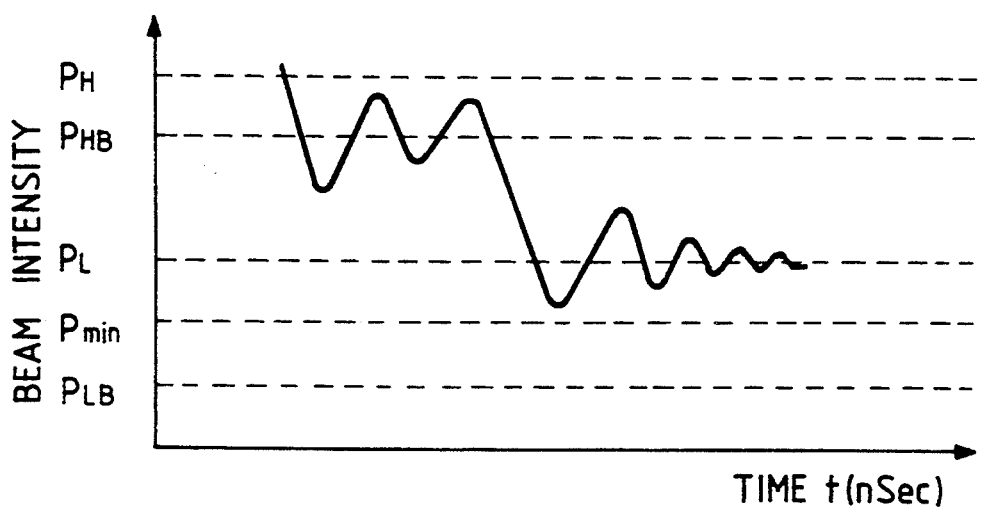

The recorded standard information is magnetooptically reproduced, and is subjected to waveform shaping, clock extraction, and binary coding of the waveform. Then, $10^6$ windows (a in FIG. 32) each indicating a shift between the edge position of the reproduced waveform and a clock are accumulated, and are plotted on a histogram shown in FIG. 32. In FIG. 32, the ratio of the window to the clock period is measured as a window margin. As the window margin is larger, the ease of discrimination of data is higher (better).

The window margins of Embodiments 6-1, 6-2, and 6-3 (Table 2) waveform-shaped according to the present invention exhibit larger values than Comparative Examples 1, 2, and 3, and the ease of discrimination of data is very good in these embodiments.

(6) Others

Waveform shaping according to the present invention is not limited to the above embodiment. For example, the waveform may be shaped, as shown in FIGS. 33A to 38B. In four examples shown in FIGS. 33A, 33B, 36A, and 36B, the waveform has rounded corners in place of a rectangular shape. In four examples shown in FIGS. 34A, 34B, 35A, and 35B, the waveform oscillates at the positions of $P_H$, $P_{HB}$, $P_L$, and $P_{LB}$ when a pulse rises. In four examples shown in FIGS. 37A, 37B, 38A, and 38B, the waveform oscillates at the positions of $P_L$, $P_{LB}$, and $P_{HB}$ when a pulse falls.

TABLE 2

| Recorded Pulse Waveform | Window Margin [%] |
|---|---|
| Comparative Example 1 | 10 |
| Comparative Example 2 | 13 |
| Comparative Example 3 | 15 |
| Embodiment 6-1 | 20 |
| Embodiment 6-2 | 23 |
| Embodiment 6-3 | 25 |

Effect of the Invention

As described above, when the pulse waveform is shaped (first shaping) so that the beam intensity is set to be high at the start point of $P_H$, and thereafter is lowered, the power margin is widened.

In addition, the following effects (i) and (iii) are obtained.

(i) In general, a separation zone is present between adjacent tracks, and a magnetic thin film is also present on this separation zone. Since recording is a heat mode, if heat is conducted to the separation zone, and the adjacent track, an excessively thick mark is often formed beyond the track width. In some case, the mark extends to the adjacent track, and the same information is undesirably recorded. In this case, when the information is reproduced, the information on the adjacent track is reproduced. This phenomenon is called cross talk. According to the present invention, possibility of cross talk can be decreased or eliminated.

(ii) For a medium provided with the I layer according to the selection invention, a decrease in $P_H$ margin can be reduced. In the I layer, even when a beam of $P_H$ is radiated, and the temperature is increased (as a result, the coercivity is decreased), the direction of magnetization must not be inverted by Hb. In contrast to this, $P_H$ has a new upper limit $P_{Hmax}$ which does not exceed the Curie temperature of the I layer. $P_{Hmax}$ may be a vertical line passing $P_H = 13$ mW in, e.g., FIG. 20. At this time, in the prior art, since the power margin (hatched portion) is close to the vertical line of $P_{Hmax}$, the $P_H$ margin is decreased. In contrast to this, according to the present invention, since the power margin (cross-hatched portion) is separated away from the vertical line of $P_{Hmax}$, the decrease in $P_H$ margin can be reduced.

Figure 25:
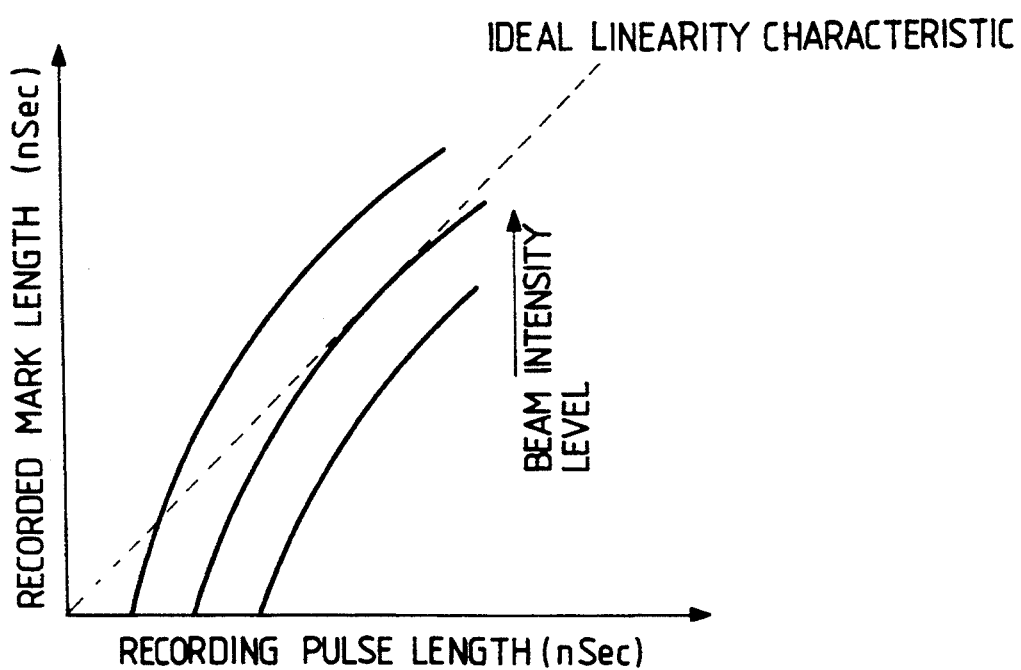
FIG. 25 is an explanatory view for explaining linearity.
Figure 26:
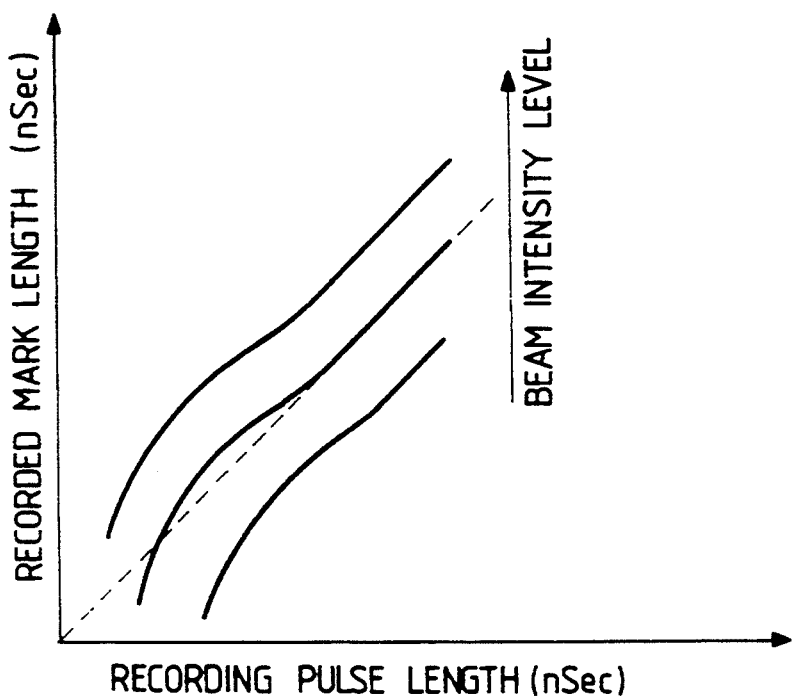
FIG. 26 is an explanatory view for explaining linearity.

(iii) Mark Length Recording: In PWM (pulse width modulation), the present invention causes the relationship between the mark length (the length of an actually recorded mark; it is estimated by the PDT of the pulse in the reproduction mode), and the pulse length (PDT in the recording mode) to approach a linear relationship. In other words, linearity is improved. In the prior art, as shown in FIG. 25, when the pulse length is short, the mark length tends to become excessively short. This tendency decreases the C/N ratio in the reproduction mode. In contrast to this, according to the present invention, as shown in FIG. 26, this tendency is low, and linearity is high.

In addition to the first shaping (the pulse waveform is shaped so that the beam intensity is set to be high at the start point of $P_H$, and thereafter is lowered according to the present invention), second shaping is performed to improve the ease of discrimination of data. In the second shaping, (1) when the beam intensity is increased from $P_L$ to $P_H$, it is temporarily decreased below $P_{Lmin}$, and is then raised to $P_H$, or (2) when the beam intensity is decreased from $P_H$ to $P_L$, it is temporarily decreased below $P_{Lmin}$, and is then returned to $P_L$. Even when the value $P_{LB}$ is set to be close to 0, a pre-recorded mark can be almost completely erased, and an unerased portion will not be formed. Thus, the C/N ratio can be increased, and since a pre-recorded mark can be almost completely erased, the ease of discrimination of data can be improved.

What is claimed is:

1. An over-write magnetooptical recording method having improved ease of discrimination of data, comprising the steps of:

preparing an over-write multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction;

rotating said medium;

radiating a laser beam onto said medium;

pulse-modulating an intensity of the laser beam between a high level $P_H$ and a low level $P_L$ according to binary coded information to be recorded; and applying a bias field to an irradiation position of the laser beam, wherein when a mark previously formed by the beam at the high level $P_H$ is defined as a pre-recorded mark, and a minimum low level $P_L$ for erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level $P_H$, the intensity of the laser beam is decreased to continue the mark formation after mark formation based on the high level $P_H$ is started, and the intensity is returned to the low level $P_L$ after the mark formation.

2. An over-write magnetooptical recording method having improved ease of discrimination of data, comprising the steps of:

preparing an over-write multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction;

rotating said medium;

irradiating a laser beam onto said medium;

pulse-modulating an intensity of the laser beam between a high level $P_H$ and a low level $P_L$ according to binary coded information to be recorded; and applying a bias field to an irradiation position of the laser beam, wherein when a mark previously formed by the beam at the high level $P_H$ is defined as a pre-recorded mark, and a minimum low level $P_L$ for erasing the pre-recorded mark upon irradiation of a DC-ON laser beam is defined as a limit value $P_{Lmin}$, the intensity of the laser beam is increased from the low level $P_L$ to the high level $P_H$, the intensity of the laser beam is decreased to continue the mark formation after mark formation based on the high level $P_H$ is started, and after the mark formation, the intensity is temporarily decreased below the limit value $P_{Lmin}$ and is returned to the low level $P_L$.

3. An over-write magnetooptical recording method having improved ease of discrimination of data, comprising the steps of:

preparing an over-writing capable multi-layered magnetooptical recording medium, which consists of at least two layers including a memory layer and a writing layer, and in which the memory layer and the writing layers are exchange-coupled to each other, a direction of magnetization of the writing layer can be aligned in a predetermined direction at room temperature without changing a direction of magnetization of the memory layer, and the direction of the magnetization of the writing layer is already aligned in the predetermined direction;

rotating said medium;

irradiating a laser beam onto said medium;

pulse-modulating an intensity of the laser beam between a high level $P_H$ and a low level $P_L$ according to binary coded information to be recorded; and applying a bias field to an irradiation position of the laser beam, wherein when a mark previously formed by the beam at the high level $P_H$ is defined as a pre-recorded mark, and a minimum low level $P_L$ for erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level $P_H$, the intensity of the laser beam is decreased to continue the mark formation after mark formation based on the high level $P_H$ is started, and after the mark formation, when the intensity is decreased to the low level $P_L$, the intensity is temporarily decreased below the limit value $P_{Lmin}$ and is then returned to the low level $P_L$.

4. An over-write magnetooptical recording apparatus comprising:

rotating means for rotating a magnetooptical recording medium;

a laser beam light source;

a light source drive circuit for pulse-modulating an intensity of a laser beam between a high level $P_H$ and a low level $P_L$ according to binary coded information to be recorded;

bias field applying means; and a pulse waveform shaping circuit, in which when a mark previously formed by the beam at the high level $P_H$ is defined as a pre-recorded mark, and a minimum low level $P_L$ for erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level $P_H$, the intensity of the laser beam is decreased to continue the mark formation after mark formation based on the high level $P_H$ is started, and the intensity is returned to the low level $P_L$ after the mark formation.

5. An over-write capable magnetooptical recording apparatus comprising:

rotating means for rotating a magnetooptical recording medium;

a laser beam light source;

a light source drive circuit for pulse-modulating an intensity of a laser beam between a high level $P_H$ and a low level $P_L$ according to binary coded information to be recorded;

bias field applying means; and a pulse waveform shaping circuit, in which when a mark previously formed by the beam at the high level $P_H$ is defined as a pre-recorded mark, and a minimum low level $P_L$ capable of erasing the pre-recorded mark upon irradiation of a DC-ON laser beam is defined as a limit value $P_{Lmin}$, the intensity of the laser beam is increased from the low level $P_L$ to the high level $P_H$, the intensity of the laser beam is decreased to continue the mark formation after mark formation based on the high level $P_H$ is started, and after the mark formation, the intensity is temporarily decreased below the limit value $P_{Lmin}$ and is returned to the low level $P_L$.

6. An over-write magnetooptical recording apparatus comprising:

rotating means for rotating a magnetooptical recording medium;

a laser beam light source;

a light source drive circuit for pulse-modulating an intensity of a laser beam between a high level $P_H$ and a low level $P_L$ according to binary coded information to be recorded;

bias field applying means; and a pulse waveform shaping circuit, in which when a mark previously formed by the beam at the high level $P_H$ is defined as a pre-recorded mark, and a minimum low level $P_L$ for erasing the pre-recorded mark upon irradiation of a DC-ON laser beam is defined as a limit value $P_{Lmin}$, when the intensity of the laser beam is increased from the low level $P_L$ to the high level $P_H$, the intensity is temporarily decreased below the limit value $P_{Lmin}$ and is then increased to the high level the intensity of the laser beam is decreased to continue the mark formation after mark formation based on the high level $P_H$ is started, and after the mark formation, when the intensity is decreased to the low level $P_L$, the intensity is temporarily decreased below the limit value $P_{Lmin}$ and is then returned to the low level $P_L$.

* * * * *